(12) United States Patent
Emtman

(10) Patent No.: US 11,328,409 B2
(45) Date of Patent: May 10, 2022

(54) SYSTEM AND METHOD UTILIZING MULTI-POINT AUTOFOCUS TO ALIGN AN OPTICAL AXIS OF AN OPTICAL ASSEMBLY PORTION TO BE NORMAL TO A WORKPIECE SURFACE

(71) Applicant: Mitutoyo Corporation, Kanagawa-ken (JP)

(72) Inventor: Casey Edward Emtman, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days.

(21) Appl. No.: 17/038,532

(22) Filed: Sep. 30, 2020

(65) Prior Publication Data

US 2022/0101511 A1    Mar. 31, 2022

(51) Int. Cl.
*G06T 7/00* (2017.01)
*H04N 5/232* (2006.01)
(Continued)

(52) U.S. Cl.
CPC .......... *G06T 7/0004* (2013.01); *B25J 9/1697* (2013.01); *B25J 15/0019* (2013.01); *G01B 11/24* (2013.01);
(Continued)

(58) Field of Classification Search
CPC ......... G06T 7/0004; G06T 7/73; G06T 7/571; G06T 2207/10056; G06T 2207/30164;
(Continued)

(56) References Cited

U.S. PATENT DOCUMENTS 4,908,951 A    3/1990  Gurny
6,542,180 B1   4/2003  Wasserman et al.
(Continued)

FOREIGN PATENT DOCUMENTS

WO    2019/133234    7/2019

OTHER PUBLICATIONS

Alicona, "μCMM New optical micro-coordinate measurement machine," Alicona Focus Variation Magazine, English Edition 8, 2018, 65 pages.
(Continued)

*Primary Examiner* — James T Boylan
(74) *Attorney, Agent, or Firm* — Seed IP Law Group LLP

(57) ABSTRACT

A metrology system includes an optical assembly portion; an adjustment mechanism configured to change a distance and an angular orientation between the optical assembly portion and a workpiece surface; and a processor configured to control the adjustment mechanism to move the optical assembly portion to position a workpiece surface within a focal Z autofocus range; capture an image stack of the workpiece surface wherein each image of the image stack corresponds to a different autofocus height; determine an autofocus height for at least three locations of the workpiece surface; control the adjustment mechanism based on the autofocus heights to rotate the optical assembly portion relative to the workpiece surface to nominally align the optical axis of the optical assembly portion with a surface normal of the workpiece surface and adjust a distance between the optical assembly portion and the workpiece surface; and execute a defined operation on the workpiece surface.

27 Claims, 17 Drawing Sheets

(51) Int. Cl.
*G06T 7/571* (2017.01)
*G06T 7/73* (2017.01)
*B25J 15/00* (2006.01)
*B25J 9/16* (2006.01)
*G01B 11/24* (2006.01)
*H04N 5/225* (2006.01)

(52) U.S. Cl.
CPC ............... *G06T 7/571* (2017.01); *G06T 7/73* (2017.01); *H04N 5/2256* (2013.01); *H04N 5/23212* (2013.01); *G06T 2207/10056* (2013.01); *G06T 2207/30164* (2013.01)

(58) Field of Classification Search
CPC ..... B25J 9/1697; B25J 15/0019; G01B 11/24; H04N 5/2256; H04N 5/23212
See application file for complete search history.

(56) References Cited

U.S. PATENT DOCUMENTS

| | | | |
|---|---|---|---|
| 7,030,351 B2 | 4/2006 | Wasserman et al. | |
| 7,209,242 B2 * | 4/2007 | Nakamura | G01B 11/24 356/601 |
| 7,324,682 B2 | 1/2008 | Wasserman | |
| 7,342,717 B1 * | 3/2008 | Hausmann | C12Q 1/6869 359/368 |
| 7,454,053 B2 | 11/2008 | Bryll et al. | |
| 7,570,795 B2 | 8/2009 | Yu et al. | |
| 7,627,162 B2 | 12/2009 | Blanford et al. | |
| 7,652,275 B2 | 1/2010 | Gladnick | |
| 7,660,688 B2 | 2/2010 | Ishikawa et al. | |
| 8,085,295 B2 | 12/2011 | Tobiason et al. | |
| 8,111,905 B2 | 2/2012 | Campbell | |
| 8,111,938 B2 | 2/2012 | Bryll et al. | |
| 8,139,230 B2 * | 3/2012 | Roberge | F42B 35/00 356/601 |
| 8,194,307 B2 | 6/2012 | Arnold et al. | |
| 8,229,694 B2 | 7/2012 | Nakagawa et al. | |
| 8,332,173 B2 | 12/2012 | Ishikawa | |
| 8,438,746 B2 | 5/2013 | Usui | |
| 8,581,162 B2 | 11/2013 | Campbell | |
| 8,817,240 B2 | 8/2014 | Jones et al. | |
| 8,995,749 B2 | 3/2015 | Bryll | |
| 9,060,117 B2 | 6/2015 | Bryll et al. | |
| 9,115,982 B2 | 8/2015 | Jones et al. | |
| 9,143,674 B2 * | 9/2015 | Gladnick | G01B 11/24 |
| 9,161,014 B2 | 10/2015 | Prantl et al. | |
| 9,213,175 B2 | 12/2015 | Arnold | |
| 9,256,009 B2 | 2/2016 | Theriault et al. | |
| 9,291,447 B2 | 3/2016 | Bumgardner | |
| 9,639,083 B2 | 5/2017 | Tseo et al. | |
| 9,646,425 B2 | 5/2017 | Yu et al. | |
| 9,726,876 B2 | 8/2017 | Bryll | |
| 9,736,355 B1 | 8/2017 | Bryll | |
| 9,774,765 B2 | 9/2017 | Bryll et al. | |
| 9,830,694 B2 | 11/2017 | Bryll | |
| 9,881,400 B2 | 1/2018 | Zuiderweg et al. | |
| 9,930,243 B2 | 3/2018 | Gladnick et al. | |
| 9,952,586 B2 | 4/2018 | Yu et al. | |
| 9,983,459 B2 | 5/2018 | Arnold | |
| 10,007,101 B2 | 6/2018 | Prantl et al. | |
| 10,101,572 B2 | 10/2018 | Bryll et al. | |
| 10,151,962 B2 | 12/2018 | Gladnick et al. | |
| 10,178,321 B2 | 1/2019 | Emtman et al. | |
| 10,184,773 B2 | 1/2019 | Jansson | |
| 10,352,679 B2 | 7/2019 | Tobiason | |
| 10,422,636 B2 | 9/2019 | Nakagawa et al. | |
| 10,466,028 B2 | 11/2019 | Takesako | |
| 10,520,650 B2 | 12/2019 | Freerksen et al. | |
| 2006/0211802 A1 | 9/2006 | Asgari | |
| 2010/0137990 A1 | 6/2010 | Apatsidis et al. | |
| 2013/0162807 A1 * | 6/2013 | Bryll | H04N 5/232123 348/86 |
| 2015/0153560 A1 * | 6/2015 | Lippert | G02B 21/367 348/79 |
| 2016/0025903 A1 | 1/2016 | Arnold | |
| 2017/0052425 A1 | 2/2017 | Arnold | |
| 2017/0078549 A1 | 3/2017 | Emtman et al. | |
| 2017/0090742 A1 | 3/2017 | Ade et al. | |
| 2018/0143419 A1 | 5/2018 | Bryll et al. | |
| 2018/0180773 A1 | 6/2018 | Usami et al. | |
| 2019/0145764 A1 | 5/2019 | Atherton | |
| 2019/0293402 A1 | 9/2019 | Kiyotani et al. | |
| 2020/0094407 A1 | 3/2020 | Nahum et al. | |
| 2020/0195836 A1 | 6/2020 | Senekerimyan et al. | |

OTHER PUBLICATIONS

Freerksen et al., "External Reservoir Configuration for Tunable Acoustic Gradient Lens," U.S. Appl. No. 16/000,319, filed Jun. 5, 2018, 43 pages.

Mermillod-Blondin et al., "High-speed varifocal imaging with a tunable acoustic gradient index of refraction lens," Optics Letters 33(18):2146-2148, 2008.

Mitutoyo Corporation & Micro Encoder Inc., "QVPAK® 3D CNC Vision Measuring Machine," User's Guide, Version 7, Series No. 359, 2003, 329 pages.

Mitutoyo, "Probes for Coordinate Measuring Machines," Coordinate Measuring Machines, MPP-300Q/MPP-300, Bulletin No. 1989, Apr. 2010, 36 pages.

Newton et al., "Additive Manufacturing," Additive Manufacturing 25(2019), pp. 365-389, Nov. 2018, (25 pages).

Renishaw, "REVO-2 user's guide," Documentation part No. H-1000-7590-04-E, Oct. 2019, 151 pages.

Renishaw, "RVP user's guide," Part No. H-1000-3322-02-A, Nov. 2019, 24 pages.

Yu et al., "A Robotic Auto-Focus System based on Deep Reinforcement Learning," arXiv: 1809.03314v1, Sep. 5, 2018, 6 pages.

* cited by examiner

SYSTEM AND METHOD UTILIZING MULTI-POINT AUTOFOCUS TO ALIGN AN OPTICAL AXIS OF AN OPTICAL ASSEMBLY PORTION TO BE NORMAL TO A WORKPIECE SURFACE

BACKGROUND

Technical Field

This disclosure relates to precision metrology, and more particularly to use of multi-point autofocus to align an optical axis normal to a workpiece surface, to increase precision of subsequent operations (e.g., measurement operations, etc.) to be performed on the workpiece surface.

Description of the Related Art

Precision metrology systems such as precision machine vision inspection systems (or "vision systems" for short) may be utilized to obtain precise dimensional measurements of objects and to inspect various other object characteristics, and may include a computer, a camera and optical system, and a precision stage that moves to allow workpiece traversal and inspection. One exemplary prior art system is the QUICK VISION® series of PC based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, which is hereby incorporated herein by reference in its entirety. This type of system uses a microscope type optical system and moves the stage to provide inspection images of either small or relatively large workpieces.

General purpose precision machine vision inspection systems are generally programmable to provide automated video inspection. Such systems typically include selectable modes of operation as well as GUI features and predefined image analysis "video tools," such that operation and programming can be performed by "non expert" operators. For example, U.S. Pat. No. 6,542,180, which is hereby incorporated herein by reference in its entirety, teaches a vision system that uses automated video inspection including the use of various video tools.

Variable focal length (VFL) optical systems may be utilized for observation and precision measurement of surface heights, and may be included in a precision machine vision inspection system or other optical systems, for example as disclosed in U.S. Pat. No. 9,143,674, which is hereby incorporated herein by reference in its entirety. Briefly, a VFL lens is capable of acquiring multiple images at multiple focal lengths, respectively. Various types of VFL lenses are known, such as a mechanical VFL lens in which a multi-lens system is mechanically moved to change its focal length, or a non-mechanical VFL lens such as a tunable acoustic gradient ("TAG") lens which creates a lensing effect (to change its focal length) using sound waves in a fluid medium. A VFL lens in a precision machine vision inspection system may be used, for example, to acquire images of a workpiece at multiple surface heights, or "Z-heights" of the machine coordinate system (MCS).

Such configurations have often only enabled the performance of certain types of operations (e.g., acquisition of image stacks) from a single orientation (e.g., along the Z axis of the MCS). A system that can provide improvements with respect to such operations (e.g., in relation to workpieces with surfaces that are tilted and/or complex, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect, a metrology system is provided, including: an optical assembly portion; an adjustment mechanism; one or more processors; and a memory coupled to the one or more processors and storing program instructions.

The optical assembly portion includes a light source; an objective lens that inputs image light arising from a surface of a workpiece which is illuminated by the light source, and transmits the image light along an imaging optical path, wherein the objective lens defines an optical axis of the optical assembly portion which extends at least between the objective lens and the workpiece surface; and a camera that receives imaging light transmitted along the imaging optical path and provides images of the workpiece surface.

The adjustment mechanism is configured to change a distance between the optical assembly portion and the workpiece surface and to rotate the optical assembly portion relative to the workpiece surface to change an angular orientation of the optical axis of the optical assembly portion relative to the workpiece surface.

The program instructions stored in the memory, when executed by the one or more processors, cause the one or more processors to at least:

control the adjustment mechanism to move the optical assembly portion to position a workpiece surface within a focal Z autofocus range of the optical assembly portion;

capture an image stack of the workpiece surface within the focal Z autofocus range using the optical assembly portion, wherein the image stack comprises a plurality of images of the workpiece surface and each image of the image stack corresponds to a different autofocus height;

determine an autofocus height for at least three locations of the workpiece surface based on at least three corresponding regions of interest of the image stack;

control the adjustment mechanism based at least in part on the autofocus heights at the at least three locations to: rotate the optical assembly portion relative to the workpiece surface to nominally align the optical axis of the optical assembly portion with a surface normal of the workpiece surface; and adjust a distance between the optical assembly portion and the workpiece surface; and execute a defined operation on the workpiece surface.

According to another aspect, the optical assembly portion further includes a variable focal length (VFL) lens that is included in the imaging optical path, and wherein the objective lens transmits the image light along the imaging optical path through the VFL lens and the camera receives the imaging light transmitted by the VFL lens along the imaging optical path. The VFL lens may be a tunable acoustic gradient (TAG) lens configured to non-mechanically vary a focal length, and for which a periodically modulated focus position of the optical assembly portion is controlled by periodically modulating the optical power of the TAG lens. The defined operation that is executed on the workpiece surface may include utilizing the VFL lens for capturing one or more images of the workpiece surface. The defined operation that is executed on the workpiece surface may include utilizing the VFL lens for capturing an image stack while the optical axis of the optical assembly portion is nominally aligned with a surface normal of the workpiece surface, for which the image stack comprises a plurality of images of the workpiece surface and each image of the image stack corresponds to a different focus position of the optical assembly portion along the direction of the optical axis.

According to another aspect, the determining of the autofocus heights for the at least three locations of the workpiece surface includes determining focus curve data for each of the regions of interest based at least in part on an analysis of the images of the image stack, wherein for each of the at least three locations a peak of the focus curve data for the corresponding region of interest indicates the corresponding autofocus height.

According to another aspect, the program instructions when executed by the one or more processors further cause the one or more processors to:

determine a surface normal of the workpiece surface based at least in part on the autofocus heights at the at least three locations; and determine adjustment information to control the adjustment mechanism to rotate the optical assembly portion based at least in part on the determined surface normal.

According to another aspect, the defined operation may include a measurement operation for determining a dimension of a feature of the workpiece surface.

According to another aspect, the defined operation may include a points-from-focus (PFF) operation including:

acquiring an image stack including a plurality of images each corresponding to a focus position of the optical assembly portion along an imaging optical axis which coincides with the optical axis, and determining focus curve data based at least in part on an analysis of the images of the image stack, wherein the focus curve data indicates 3 dimensional positions of a plurality of surface points on the workpiece surface.

According to another aspect, the defined operation may include a machining operation that is executed on the workpiece surface, wherein a machining axis of the machining operation at least one of nominally coincides with or is nominally parallel to the optical axis of the optical assembly portion.

According to another aspect, the adjustment mechanism may include a rotation mechanism and a Z-axis movement mechanism, for which the Z-axis movement mechanism is coupled to move the optical assembly portion along a Z-axis direction and the rotation mechanism is coupled between the Z-axis movement mechanism and the optical assembly portion and is configured to rotate the optical assembly portion relative to the workpiece surface to change an angular orientation of the optical axis of the optical assembly portion relative to the workpiece surface. The metrology system may be embodied in a precision machine vision inspection system, wherein the adjustment mechanism comprises a rotary stage which includes the rotation mechanism and which is coupled between the Z-axis movement mechanism and the optical assembly portion.

According to another aspect, the metrology system may be embodied in a coordinate measuring machine system, wherein the adjustment mechanism includes:

an x-axis slide mechanism, a y-axis slide mechanism and a z-axis slide mechanism that are configured to move the optical assembly portion in mutually orthogonal x-axis, y-axis and z-axis directions, respectively, in a machine coordinate system, and a rotation mechanism configured to rotate the optical assembly portion relative to the workpiece surface.

According to another aspect, the metrology system may be embodied in a robot system, wherein the adjustment mechanism comprises a robot arm having at least three degrees of freedom for moving the optical assembly portion.

According to a further aspect, a method is provided for operating a metrology system including an optical assembly portion, wherein the optical assembly portion includes:

a light source;

an objective lens that inputs image light arising from a surface of a workpiece which is illuminated by the light source, and transmits the image light along an imaging optical path, wherein the objective lens defines an optical axis of the optical assembly portion which extends at least between the objective lens and the workpiece surface; and a camera that receives imaging light transmitted along the imaging optical path and provides images of the workpiece surface.

The method includes:

moving the optical assembly portion to position a workpiece surface within a focal Z autofocus range of the optical assembly portion;

capturing an image stack of the workpiece surface within the focal Z autofocus range using the optical assembly portion, wherein the image stack comprises a plurality of images of the workpiece surface and each image of the image stack corresponds to a different autofocus height;

determining an autofocus height for at least three locations of the workpiece surface based on at least three corresponding regions of interest of the image stack;

based at least in part on the autofocus heights at the at least three locations, determining adjustment information for rotating the optical assembly portion relative to the workpiece surface to nominally align the optical axis of the optical assembly portion with a surface normal of the workpiece surface and for adjusting a distance between the optical assembly portion and the workpiece surface;

utilizing the adjustment information for rotating the optical assembly portion to nominally align the optical axis of the optical assembly portion with a surface normal of the workpiece surface and for adjusting a distance between the optical assembly portion and the workpiece surface; and executing a defined operation on the workpiece surface.

According to another aspect, the method further includes determining a surface normal of the workpiece surface based at least in part on the autofocus heights at the at least three locations, wherein the adjustment information is determined based at least in part on the determined surface normal.

According to another aspect, the workpiece surface is a first workpiece surface of the workpiece and after the first defined operation is executed on the first workpiece surface the method further includes:

moving the optical assembly portion to position a second workpiece surface of the workpiece within a focal Z autofocus range of the optical assembly portion;

capturing an image stack of the second workpiece surface within the focal Z autofocus range using the optical assembly portion, wherein the image stack comprises a plurality of images of the second workpiece surface and each image of the image stack corresponds to a different autofocus height;

determining an autofocus height for at least three locations of the second workpiece surface based on at least three corresponding regions of interest of the image stack;

based at least in part on the autofocus heights at the at least three locations, determining adjustment information for rotating the optical assembly portion relative to the second workpiece surface to nominally align the optical axis of the optical assembly portion with a surface normal of the second workpiece surface and for adjusting a distance between the optical assembly portion and the second workpiece surface;

utilizing the adjustment information for rotating the optical assembly portion to nominally align the optical axis of the optical assembly portion with a surface normal of the second workpiece surface and for adjusting a distance between the optical assembly portion and the second workpiece surface; and executing a defined operation on the second workpiece surface.

According to a still further aspect, a metrology system is provided, which includes an optical assembly portion; a Z-axis movement mechanism configured to change a distance between the optical assembly portion and the workpiece surface; a rotation mechanism configured to rotate the optical assembly portion relative to the workpiece surface to change an angular orientation of the optical axis of the optical assembly portion relative to the workpiece surface; one or more processors; and a memory coupled to the one or more processors and storing program instructions.

The optical assembly portion includes a variable focal length (VFL) lens; a light source; an objective lens that inputs image light arising from a surface of a workpiece which is illuminated by the light source, and transmits the image light along an imaging optical path that passes through the VFL lens, wherein the objective lens defines an optical axis of the optical assembly portion which extends at least between the objective lens and the workpiece surface; and a camera that receives imaging light transmitted by the VFL lens along the imaging optical path and provides images of the workpiece surface.

The program instructions stored in the memory, when executed by the one or more processors, cause the one or more processors to at least:

control at least one of the a Z-axis movement mechanism or the rotation mechanism to move the optical assembly portion to position a workpiece surface within a focal Z autofocus range of the optical assembly portion;

capture an image stack of the workpiece surface within the focal Z autofocus range using the optical assembly portion, wherein the image stack comprises a plurality of images of the workpiece surface and each image of the image stack corresponds to a different autofocus height;

determine an autofocus height for at least three locations of the workpiece surface based on at least three corresponding regions of interest of the image stack;

based at least in part on the autofocus heights at the at least three locations, control the rotation mechanism to rotate the optical assembly portion relative to the workpiece surface to nominally align the optical axis of the optical assembly portion with a surface normal of the workpiece surface and control the Z-axis movement mechanism to adjust a distance between the optical assembly portion and the workpiece surface; and execute a defined operation on the workpiece surface.

Thus, in accordance with principles disclosed herein, systems and methods are provided which include utilizing multi-point autofocus to align an optical axis of an optical assembly portion to be nominally normal to an arbitrary workpiece surface. The systems and methods are capable of rapidly performing multi-point autofocus on the workpiece surface to derive adjustment information needed to adjust the optical axis of the optical assembly portion to be nominally normal to the workpiece surface. The systems and methods, with the optical axis rapidly (re-)oriented to be nominally normal to the workpiece surface, are useful for inspecting various types of workpiece surfaces, such as free-form workpiece surfaces (e.g., turbine blades), where the surface normal along different portions of the surface or different surfaces may keep changing, for example. The systems and methods are also useful for automatically aligning/positioning relative to the workpiece surface for subsequent non-optical operations, such as a machining (e.g., drilling) operation to be performed on the workpiece surface, where the machining operation axis coincides with the optical axis.

DETAILED DESCRIPTION

Figure 1:
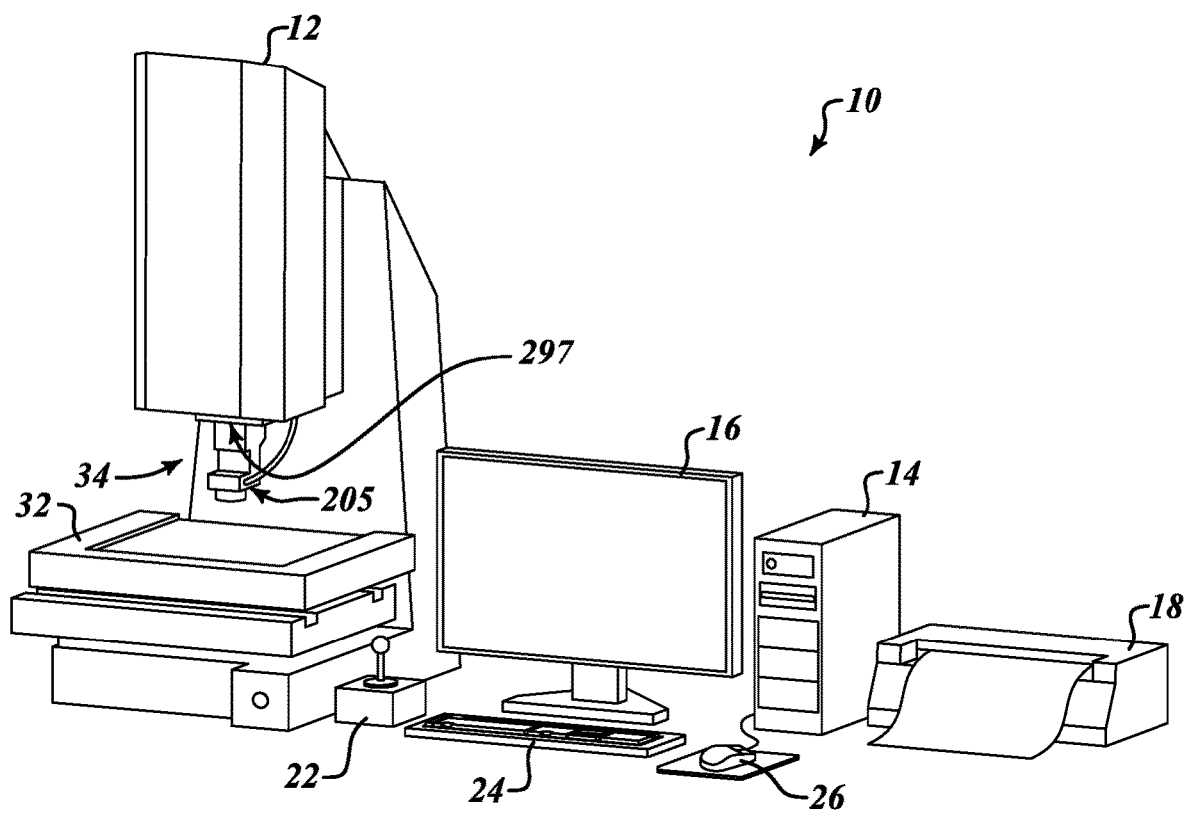
FIG. 1 is a diagram showing various typical components of a general-purpose precision machine vision inspection system including an optical assembly portion.

FIG. 1 is a block diagram of one exemplary machine vision inspection system 10 usable as or including a VFL (TAG) lens system (also referenced herein as an imaging system) in accordance with the present disclosure. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that, in various implementations, a touchscreen tablet or the like may be substituted for and/or redundantly provide the functions of any or all of the elements 14, 16, 22, 24 and 26. Various implementations of a machine vision inspection system 10 are also described in commonly assigned U.S. Pat. Nos. 7,454,053; 7,324,682; 8,111,905; and 8,111,938, each of which is hereby incorporated herein by reference in its entirety.

Those skilled in the art will appreciate that the controlling computer system 14 may generally be implemented using any suitable computing system or device, including distributed or networked computing environments, and the like. Such computing systems or devices may include one or more general-purpose or special-purpose processors (e.g., non-custom or custom devices) that execute software to perform the functions described herein. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable objective lenses. The zoom lens or interchangeable objective lenses generally provide various magnifications for the images provided by the optical imaging system 34. As will be described in more detail below with respect to FIGS. 2A and 2B, the optical imaging system 34 may include an optical assembly portion 205 (e.g., which may include the zoom lens and/or interchangeable objective lens) and which in some implementations may be coupled to a rotary stage 297.

Figure 2A:
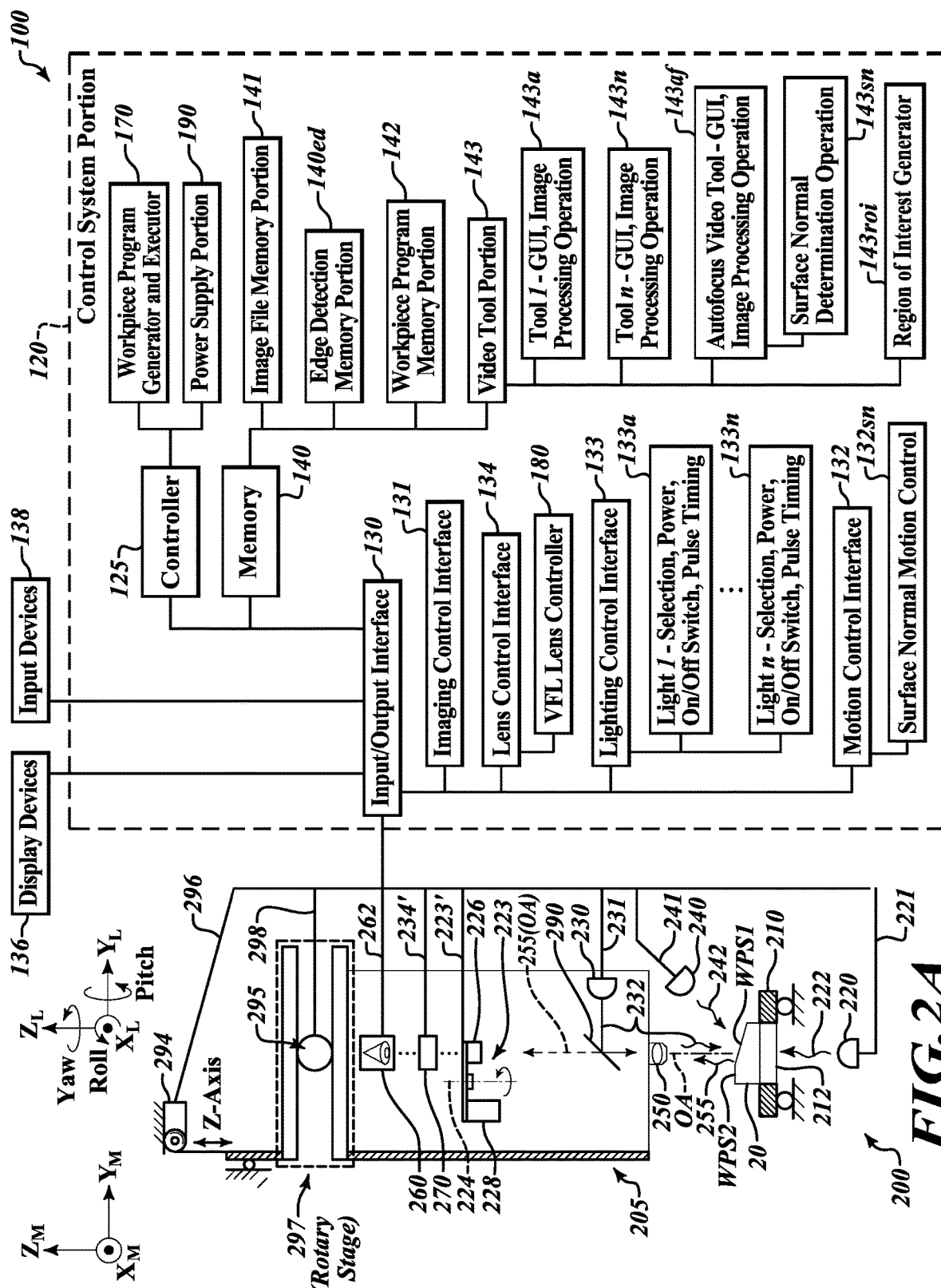
FIG. 2A is a block diagram of a control system portion and a vision components portion of a machine vision inspection system similar to that of FIG. 1 and including certain features disclosed herein wherein the optical axis of the optical assembly portion is in an initial orientation in which a multi-point autofocus process may be performed to determine a surface normal for a workpiece surface.

FIG. 2A is a block diagram of a control system portion 120 and a vision components portion 200 of a machine vision inspection system 100 similar to the machine vision inspection system of FIG. 1, including certain features disclosed herein. As will be described in more detail below, the control system portion 120 is utilized to control the vision components portion 200. The vision components portion 200 includes an optical assembly portion 205, light sources 220, 230, 240 (which may be part of, or be provided separately from, the optical assembly portion 205), and a workpiece stage 210 having a central transparent portion 212. The workpiece stage 210 (corresponding to the workpiece stage 32 in FIG. 1) is controllably movable along X and Y axes that lie in a plane that is generally parallel to the surface of the stage where a workpiece 20 is positioned. The optical assembly portion 205, which may include at least part of the light sources 220, 230, 240, further includes a camera system 260, an interchangeable objective lens 250, and a variable focal length (VFL) lens 270.

One type of known VFL lens is a tunable acoustic gradient ("TAG") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of the optical system. A TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG lenses and related controllable signal generators are available, for example, from Mitutoyo Corporation of Kanagawa, Japan. As a specific example, SR38 series TAG lenses are capable of periodic modulation having a modulation frequency of up to 1.0 MHz. Various aspects of operating principles and applications of TAG lenses are described in greater detail in U.S. Pat. Nos. 9,930,243; 9,736,355; 9,726,876; 9,143,674; 8,194,307; and 7,627,162; and in US Patent Application Publication Nos. 2017/0078549 and 2018/0143419, each of which is hereby incorporated herein by reference in its entirety. A TAG lens with its rapid varifocal imaging capability is particularly suited for use as the VFL lens 270 to perform rapid autofocus in accordance with various embodiments. Alternatively to a TAG lens, a mechanical VFL lens in which a multi-lens system is mechanically moved to change its focal length may also be used as the VFL lens 270.

In various implementations, the optical assembly portion 205 may further include a turret lens assembly 223 having lenses 226 and 228. As an alternative to the turret lens assembly, in various implementations, a fixed or manually interchangeable magnification-altering lens, or a zoom lens configuration, or the like, may be included. In various implementations, the interchangeable objective lens 250 may be selected from a set of fixed magnification objective lenses that are included as part of a variable magnification lens portion (e.g., a set of objective lenses corresponding to magnifications such as 0.5×, 1×, 2× or 2.5×, 5×, 7.5×, 10×, 20× or 25×, 50×, 100×, etc.).

The optical assembly portion 205 is controllably movable along a Z axis of the MCS (i.e., a $Z_M$ axis) that is generally orthogonal to the X and Y axes of the MCS (i.e., the $X_M$ and $Y_M$ axes) by using a controllable motor 294 that drives an actuator to move the optical assembly portion 205 along the $Z_M$ axis (e.g., which may change a distance between the optical assembly portion 205 and a workpiece 20, which may also change a focus of the image of the workpiece 20). The controllable motor 294 is connected to an input/output interface 130 via a signal line 296. As will be described in more detail below, the VFL (TAG) lens 270 may be controlled via a signal line 234' by a lens control interface 134 to periodically modulate the optical power of the VFL lens 270 and thus modulate an effective focus position (or a focal length) of the optical assembly portion 205 (e.g., which in some implementations/orientations may be utilized to change the focus of the image over a relatively smaller range, or as an alternative to moving the optical assembly portion 205 to change the focus of an image of a workpiece). The lens control interface 134 may include a VFL lens controller 180, as described in greater detail below. The workpiece stage 210, on which the workpiece 20 is placed, may be controlled to move relative to the optical assembly portion 205 (e.g., in X and Y directions and/or as part of a rotatable stage in a Z direction, etc.), such that the field of view of the interchangeable objective lens 250 moves (e.g., between surfaces and/or surface locations on the workpiece 20 and/or among a plurality of workpieces 20, etc.)

One or more of the stage light source 220, coaxial light source 230, and surface light source 240 (e.g., a ring light) may emit source light 222, 232, and/or 242, respectively, to illuminate a workpiece 20 or workpieces 20. In various exemplary embodiments, strobed illumination may be used. For example, during an image exposure, the coaxial light source 230 may emit strobed source light 232 along a path including a beam splitter 290 (e.g., a partial mirror). The source light 232 is reflected or transmitted as image light 255, and the image light used for imaging passes through the interchangeable objective lens 250, the turret lens assembly 223 and the VFL (TAG) lens 270, and is gathered by the camera system 260. A workpiece image exposure, which includes the image of the workpiece(s) 20, is captured by the camera system 260, and is output on a signal line 262 to the control system portion 120.

Various light sources (e.g., the light sources 220, 230, 240) may be connected to a lighting control interface 133 of the control system portion 120 through associated signal lines (e.g., busses 221, 231, 241, respectively). The control system portion 120 may control the turret lens assembly 223 to rotate along axis 224 to select a turret lens through a signal line or bus 223' to alter an image magnification.

As described above, in various implementations a relative position, distance, etc. of the optical assembly portion 205 (for example, the objective lens 250 of the optical assembly portion 205) to a workpiece surface WPS1 and/or WPS2 of the workpiece 20 to be measured may thus be adjusted along the Z axis of the MCS (e.g., using the controllable motor 294), and along the X and Y axes of the MCS (e.g., by moving the workpiece stage 210). In various implementations, the controllable motor 294 and the movable workpiece stage 210 may collectively be part of an adjustment mechanism configured to change, at least, a distance, position, and/or orientation between the optical assembly portion 205 and the workpiece surface WPS1 and/or WPS2.

In accordance with various embodiments of the present disclosure, the adjustment mechanism may further include a rotation mechanism 295 configured to rotate the optical assembly portion 205 relative to the workpiece surface WPS1 of the workpiece 20 to change an orientation (e.g., an angular orientation) of the optical axis OA of the optical assembly portion 205 relative to the workpiece surface WPS1. In various implementations, the rotation of the optical assembly portion 205 to change an orientation of the optical axis OA relative to the workpiece surface WPS1 may at least partially correspond to roll and/or pitch rotations.

As illustrated in FIG. 2A, the optical assembly portion 205 has a local coordinate system (LCS), including X, Y and Z axes of the LCS (i.e., $X_L$, $Y_L$ and $Z_L$ axes), which may move and rotate with the optical assembly portion 205, and for which the optical axis OA is aligned with (e.g., defines) the $Z_L$ axis. In the orientation illustrated in FIG. 2A, the LCS is generally aligned with the MCS (i.e., for which the optical axis OA is aligned with the $Z_M$ axis of the MCS). In certain prior systems, the orientation of the optical axis OA of an optical assembly portion was relatively fixed, so as to always be aligned with the $Z_M$ axis of the MCS. With respect to the LCS, yaw, pitch and roll rotations may correspond to rotations around respective axes. In the illustrated configuration, rotation about the $X_L$ axis (e.g., referenced as a first rotary axis) may be referenced as roll, rotation about the $Y_L$ axis (e.g., referenced as a second rotary axis) may be referenced as pitch, and rotation about the $Z_L$ axis may be referenced as yaw.

In some implementations, the rotation mechanism 295 may provide rotation of the optical assembly portion 205 that corresponds to rotation about at least one of a first rotary axis (e.g., roll) and/or a second rotary axis (e.g., pitch). As used herein, the first rotary axis "and/or" the second rotary axis thus means the first rotary axis alone, the second rotary axis alone, or both of the first rotary axis and the second rotary axis. Though the first rotary axis and the second rotary axis may be, for example, the $X_L$ and $Y_L$ axes that are orthogonal to each other, they need not be orthogonal to each other nor be orthogonal to the $Z_L$ axis. The first rotary axis and the second rotary axis need only each be non-parallel (including non-co-linear) with each other and with the $Z_L$ axis. In general, in various implementations the rotation mechanism 295 may provide rotatory motion that is "out of plane to the $Z_L$ axis" (e.g., including at least one of roll or pitch, or a combination thereof).

Figure 2B:
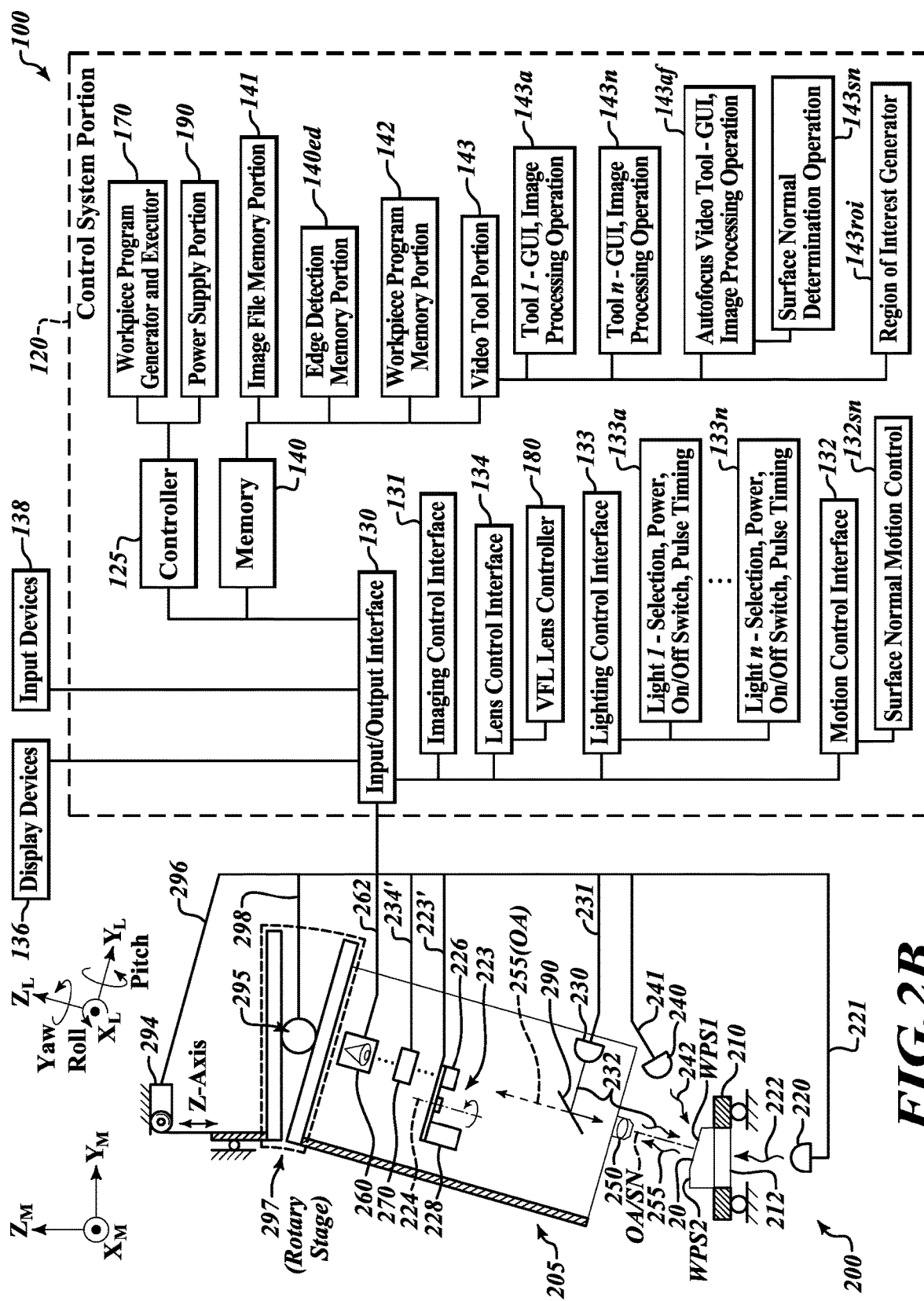
FIG. 2B is a block diagram of the machine vision inspection system of FIG. 2A, wherein the vision components portion is controlled to orient the optical axis of the optical assembly portion to be nominally normal to the workpiece surface.

As will be described in more detail below, FIG. 2B illustrates a configuration in which the rotation mechanism 295 has been utilized to rotate the optical assembly portion 205 relative to the workpiece surface WPS1 to change an angular orientation of the optical axis OA of the optical assembly portion 205, so as to orient the optical axis OA to be nominally normal (i.e., approximately perpendicular) to the workpiece surface WPS1. In addition, the motor 294 has been utilized to adjust a distance between the optical assembly portion 205 and the workpiece surface WPS1 (e.g., so that the relative position of the workpiece surface is nominally at a desired $Z_L$ position relative to the optical assembly portion 205, such as nominally at a desired focus position). As used herein, the term "nominally" encompasses variations of one or more parameters that fall within acceptable tolerances. As an example, in one specific implementation an element (e.g., an optical axis OA) may be defined as being nominally normal (i.e., nominally perpendicular) to a workpiece surface (e.g., as may defined according to a calculated surface plane) if it is normal (i.e., perpendicular) or within 5 degrees of being normal to the workpiece surface (e.g., having an angular orientation between 85 degrees and 95 degrees relative to the workpiece surface). As another example, in one specific implementation an optical axis OA of an optical assembly portion may be defined as being nominally normal (i.e., approximately perpendicular) to a workpiece surface (e.g., as may be defined according to a calculated surface plane and for which in some instances the workpiece surface may be relatively flat and located at or near a best focus position of the optical assembly portion) if all areas of the workpiece surface within the field of view (FOV) of the optical assembly portion are within four depths of field (DOF) of an average or otherwise designated or best $Z_L$ (i.e., focus) location relative to the optical assembly portion 205. In one implementation, this may correspond to at least a portion of the workpiece surface being at a best focus position and all of the other portions of the workpiece surface in the FOV being within 4 DOFs of the best focus position (i.e., for which the optical axis OA of the optical assembly portion is correspondingly nominally normal to the workpiece surface). As another example, a workpiece surface may be defined as being nominally at a best focus position if all of the portions of the workpiece surface in a FOV are within 4 DOFs of the best focus position. In other examples, the system and/or definitions may be more precise (e.g., such as being within 2 DOFs, within 2 degrees, within 2 percent, etc.)

Relative to the orientation of FIG. 2A, the rotation which results in the orientation of FIG. 2B corresponds to roll rotation about the $X_L$ axis (e.g., a first rotary axis). In other configurations, such rotations (e.g., to nominally align the optical axis OA with a surface normal of a workpiece surface) may also or alternatively include pitch rotation about the $Y_L$ axis (e.g., a second rotary axis). As illustrated in FIG. 2B, in accordance with the rotation of the optical assembly portion 205, the LCS has correspondingly also been rotated (e.g., relative to the MCS), for which the optical axis OA is aligned with (e.g., defines) the $Z_L$ axis.

Various implementations of the rotation mechanism 295 are possible. For example, as illustrated in FIGS. 1 and 2A, the rotation mechanism 295 may be provided as part of a rotary stage 297 of the vision measuring machine 12, to which the optical assembly portion 205 is attached. Thus, in various implementations the optical assembly portion 205 may be controllably rotatable by driving an actuator (e.g., as part of the rotation mechanism 295) to move (e.g., rotate) the rotary stage 297. The rotary stage 297 (e.g., including the rotation mechanism 295) is connected to the input/output interface 130 via a signal line 298.

Alternatively or in addition, the movable workpiece stage 210 may be configured to embody a rotary stage (e.g., including a rotation mechanism, not shown), which may be configured and controlled similarly to the rotary stage 297 described above. As with the rotary stage 297 described above, the movement (e.g., rotation) of the workpiece stage 210, which is additionally configured as a rotary stage, can be controlled via a signal line (e.g., similar to the signal line 298) by the control system portion 120 to effect desirable rotation (e.g., of an angular orientation of a workpiece 20 that is located on the workpiece stage 210).

As shown in FIG. 2A, in various exemplary implementations, the control system portion 120 includes a controller 125, the input/output interface 130, a memory 140, a work- piece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and the lens control interface 134. The lens control interface 134 includes or is connected to the VFL lens controller 180 including circuits and/or routines for controlling the operation of the VFL (TAG) lens 270 (e.g., as described in more detail below with respect to FIG. 4). The lighting control interface 133 includes lighting control elements 133a-133n that control, for example, the selection, power, on/off switch and strobe pulse timing, if applicable, for the various corresponding light sources of the machine vision inspection system 100.

The motion control interface 132 is configured to send control signaling via the signal lines 296 and 298 to move the optical assembly portion 205. In various implementations, the motion control interface 132 may include a surface normal motion control portion 132sn, which may be utilized to implement specific processes to adjust and/or change the orientation of the optical axis OA of the optical assembly portion 205 so as to be nominally normal to a workpiece surface (e.g., a workpiece surface WPS1 and/or WPS2). The control signaling may also be sent (e.g., from the motion control interface 132 or surface normal motion control portion 132sn) to adjust and/or change a distance between the optical assembly portion 205 and the workpiece surface WPS1 and/or WPS2 (e.g., to position the optical assembly portion 205 nominally at a desired focus position relative to the workpiece surface, which may depend on the process to be performed on the workpiece surface, such as for PFF operations, or obtaining an extended depth of field (EDOF) image, or machining operations, etc.)

The memory 140 may include an image file memory portion 141, an edge-detection memory portion 140ed, a workpiece program memory portion 142 that may include one or more part programs, or the like, and a video tool portion 143. The video tool portion 143 includes various tools 143a-143n, in particular an autofocus video tool 143af, which determine the GUI, image-processing operation, etc., for each of the corresponding video tools. The video tool portion 143 also includes a region of interest (ROI) generator 143roi that supports automatic, semi-automatic and/or manual operations that define various ROIs that are operable in various video tools, such as the autofocus video tool 143af, included in the video tool portion 143.

The autofocus video tool 143af determines the GUI, image-processing operation, etc., for focus height (i.e., effective focus position ($Z_L$-height)) measurement operations, using the VFL lens 270 controlled via the input/output interface 130. In various implementations, the autofocus video tool 143af may additionally include a high-speed focus height tool that may be utilized to measure focus heights with high speed, as described in more detail in U.S. Pat. No. 9,143,674, which is incorporated above. High-speed autofocus and/or focus position determination for an image region or regions of interest may be based on analyzing the image to determine a corresponding focus characteristic value (e.g., a quantitative contrast metric value and/or a quantitative focus metric value) for various regions, according to known methods. For example, such methods are disclosed in U.S. Pat. Nos. 8,111,905; 7,570,795; and 7,030,351, each of which is hereby incorporated herein by reference in its entirety.

In various implementations, the autofocus video tool 143*af* may include and/or be associated with a surface normal determination portion 143*sn*, which may be utilized to implement specific processes (e.g., including or in conjunction with a multi-point autofocus process) for determining a surface normal of a workpiece surface. In certain implementations, the surface normal determination portion 143*sn* may be implemented as an independent process or mode relative to the autofocus video tool 143*af*, and may independently or otherwise initiate a multi-point autofocus process and/or subsequent processing for determining a surface normal (e.g., and for determining a corresponding desired focus position in some implementations), in accordance with methods as disclosed herein, as will be described in more detail below.

In accordance with various implementations, the controller 125, in cooperation with the VFL lens controller 180 and the surface normal determination portion 143*sn*, may capture an image stack including multiple images at varying focal lengths of the workpiece surface WPS1, and calculate an autofocus height (e.g., $Z_L$-height) for least three locations of the workpiece surface WPS1 based on at least three corresponding regions of interest (ROIs) of the image stack. In various embodiments, there may be no need to change the relative orientation between the optical assembly portion 205 and the workpiece surface WPS1 for the purpose of calculating the at least three autofocus heights, as will be more fully described below in reference to FIGS. 6A and 6B. In various implementations, the at least three autofocus heights may be calculated/determined to define/determine a surface (e.g., according to a defined/determined plane or other representation which may include the three autofocus heights and/or a calculated average or other determination thereof), to thereby calculate a surface normal of the calculated/defined surface. Those skilled in the art will understand that more than three autofocus heights may be calculated to more precisely define the surface according to the increasing number of calculated autofocus heights, such as tens (10, 20, 50, etc.) or hundreds of autofocus heights, as long as extra computational load and processing time are acceptable in particular applications.

In various implementations, a calculated surface normal and/or other data based at least in part on the at least three autofocus heights (e.g., related to the defined/determined surface) may be utilized (e.g., by the surface normal determination portion 143*sn*, the controller 125 and/or the surface normal motion control portion 132*sn*, etc.) to calculate adjustment information. In accordance with the calculated adjustment information, the surface normal motion control portion 132*sn* and/or the motion control interface 132 may control the adjustment mechanism (e.g., the controllable motor 294 and the rotation mechanism 295) to move/rotate the optical assembly portion 205 so as to nominally align the optical axis OA of the optical assembly portion 205 with the surface normal SN of the workpiece surface WPS1 and to adjust a distance between the optical assembly portion 205 and the workpiece surface WPS1. For example, FIG. 2B illustrates the adjustment mechanism having been used to (re-)orient the optical assembly portion 205 such that the optical axis OA of the optical assembly portion 205 nominally coincides with the calculated surface normal SN of the workpiece surface WPS1. As will be described in more detail below, in the example of FIG. 2B the adjustment mechanism has also been controlled to adjust a distance between the optical assembly portion 205 and the workpiece surface WPS1 (e.g., so that the workpiece surface WPS1 is nominally at a desired $Z_L$ (i.e., focus) location relative to the optical assembly portion 205). In various implementations, the surface normal determination portion 143*sn* and the surface normal motion control portion 132*sn*, and/or the various processes associated therewith, may be implemented as separate portions/components, and/or may be merged and/or otherwise indistinguishable.

The controller 125 or other component may thereafter execute a defined operation on the workpiece surface WPS1, which is now nominally normal to the optical axis OA and at a desired $Z_L$ location, such as optical measurement operations (e.g., including imaging), or machining operations (e.g., drilling) on the workpiece surface, etc. When performing certain imaging operations, as noted above it may be desirable for the distance between the optical assembly portion and the workpiece surface (i.e., as adjusted by the adjustment mechanism and as corresponding to the $Z_L$ location) to nominally correspond to a desired focus position, which may be a best focus position at which the workpiece surface is nominally in focus, or alternatively to correspond to a different focus position (e.g., an off-focus position for certain types of EDOF operations, etc.) When performing machining operations, in various implementations the machining operation axis may be assumed to coincide with and/or otherwise be parallel to the optical axis OA of the optical assembly portion 205 such that the machining operation (e.g., a drilling operation, etc.) is performed along an axis that is nominally normal to the calculated surface of the workpiece.

In general, in various implementations the controller 125 and the memory 140 include necessary circuits and/or routines to implement a method of the present disclosure as will be more fully described below including: positioning the optical assembly portion 205 relative to the workpiece surface WPS1; capturing an image stack of the workpiece surface at multiple focal lengths; determining an autofocus height for at least three locations of the workpiece surface based on at least three corresponding ROIs of the image stack (e.g., for which a surface normal and corresponding adjustment information may be determined based on the autofocus heights); controlling the adjustment mechanism to: rotate the optical assembly portion 205 relative to the workpiece surface WPS1 to nominally align the optical axis of the optical assembly portion 205 with a (e.g., calculated) surface normal SN of the workpiece surface WPS1; and adjust a distance between the optical assembly portion and the workpiece surface WPS1 (e.g., so that the workpiece surface WPS1 is nominally at a desired/specified/determined $Z_L$ location); and executing a defined operation on the workpiece surface WPS1.

One or more display devices 136 (e.g., the display 16 of FIG. 1) and one or more input devices 138 (e.g., the joystick 22, keyboard 24, and mouse 26 of FIG. 1) may be connected to the input/output interface 130. The display devices 136 and input devices 138 may be used to display a user interface that may include various GUI features that are usable to perform inspection operations, and/or to create and/or modify part programs, to view the images captured by the camera system 260, and/or to directly control the vision components portion 200.

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). Such operations may include processes such as those described herein, including utilizing multipoint autofocus to align an optical axis of an optical assembly portion to be nominally normal to a workpiece surface and to adjust a distance between the optical assembly portion and the workpiece surface, and performing subsequent operations (e.g., imaging, measurements, etc.) on the workpiece surface. The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

Figure 3A:
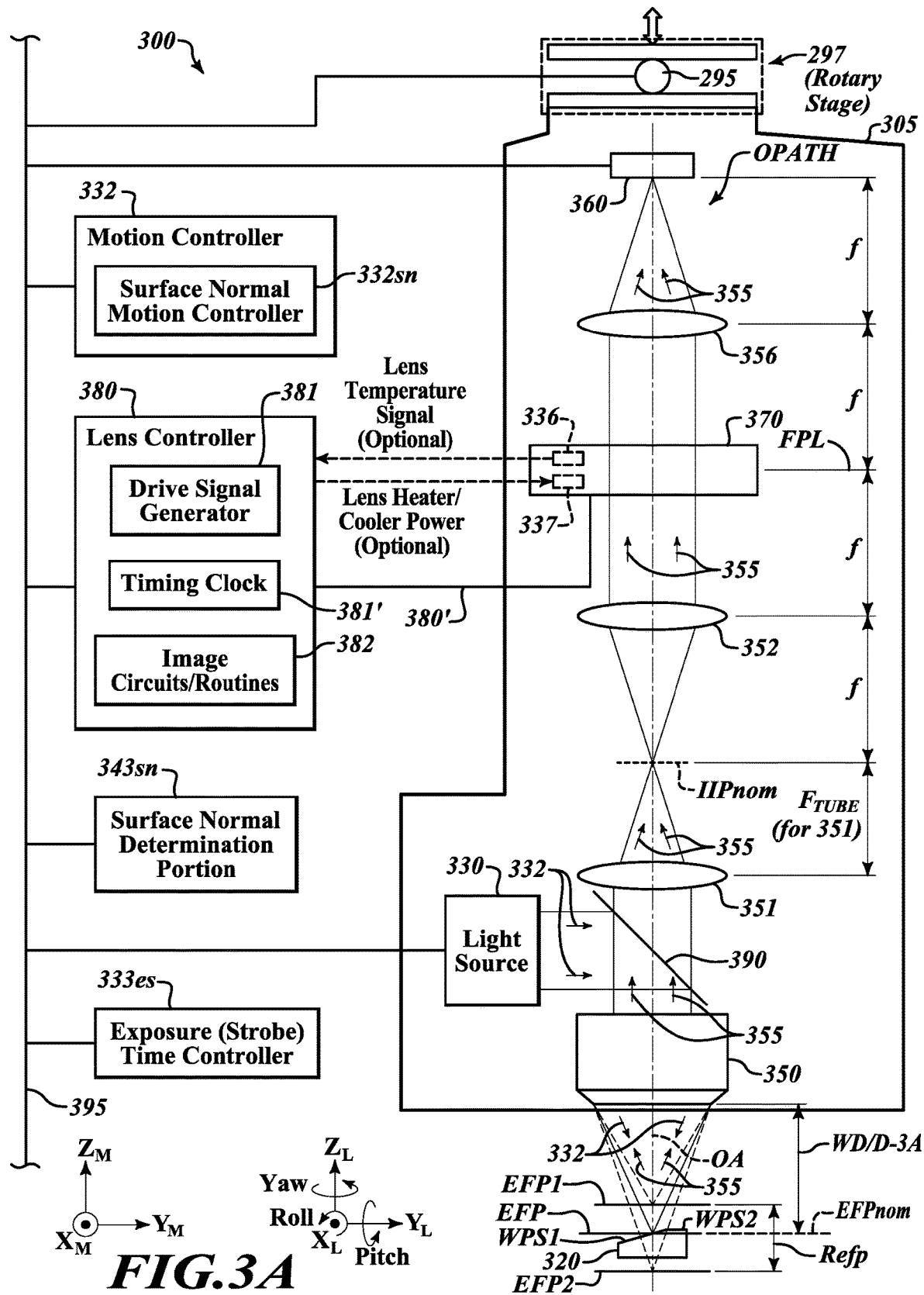
FIG. 3A is a schematic diagram of a VFL (TAG) lens system that may be adapted to a precision metrology system such as a machine vision inspection system, and in which the optical axis of an optical assembly portion is in an initial orientation in which a multi-point autofocus process may be performed to determine a surface normal for a workpiece surface.

FIG. 3A is a schematic diagram of a VFL (TAG) lens system 300, which includes an optical assembly portion 305 that includes a TAG lens 370 as corresponding to the VFL lens 270 of FIG. 2A. The TAG lens system 300 and/or the optical assembly portion 305 may be adapted to a machine vision system of the type illustrated in FIGS. 1 and 2A and 2B, or may be adapted in a robot system of FIG. 7 or in a coordinate measuring machine (CMM) system of FIGS. 8A-8E, as described below. It will be appreciated that certain numbered components 3XX of FIG. 3A may correspond to and/or provide similar operations or functions as similarly numbered components 1XX or 2XX of FIG. 2A, and may be similarly understood unless otherwise indicated.

An imaging optical path OPATH (also called a workpiece imaging optical path herein) comprises various optical components arranged along a path that conveys image light 355 from a workpiece 320 to the camera 360. The image light is generally conveyed along the direction of their optical axes. In the implementation shown in FIG. 3A, all the optical axes are aligned. However, it will be appreciated that this implementation is intended to be exemplary only and not limiting. More generally, the imaging optical path OPATH may include mirrors and/or other optical elements, and may take any form that is operational for imaging the workpiece 320 using a camera (e.g., the camera 360) according to known principles. In the illustrated implementation, the imaging optical path OPATH includes the TAG lens 370 (which may be included in a 4f imaging configuration) and is utilized at least in part for imaging a surface of a workpiece 320 during a workpiece image exposure.

As shown in FIG. 3A, the TAG lens system 300 includes the optical assembly portion 305, which includes a light source 330, an objective lens 350, a tube lens 351, a relay lens 352, the VFL (TAG) lens 370, a relay lens 356, and a camera 360. The TAG lens system 300 may also include an exposure (strobe) time controller 333es, a VFL (TAG) lens controller 380, a motion controller 332 (e.g., including a surface normal motion controller 332sn), and a surface normal determination portion 343sn. In various implementations, the motion controller 332, surface normal motion controller 332sn and/or surface normal determination portion 343sn may operate substantially similarly to the controllers/portions 132, 132sn, and 143sn, respectively, as described above with respect to FIGS. 2A and 2B. In various implementations, the various components may be interconnected by direct connections or one or more data/control busses (e.g., a system signal and control bus 395) and/or application programming interfaces, etc.

As will be described in more detail below (e.g., including with respect to FIG. 4), in various implementations, the VFL lens controller 380 may control a drive signal of the TAG lens 370 to periodically modulate optical power of the TAG lens 370 over a range of optical powers that occur at respective phase timings within the periodic modulation. The objective lens 350 inputs image light arising from a workpiece 320 during an image exposure, and transmits the image light along the imaging optical path OPATH through the TAG lens 370 to the camera 360 during the image exposure, to provide a workpiece image in a corresponding camera image. An effective focus position EFP in front of the objective lens 350 during an image exposure corresponds to the optical power of the TAG lens 370 during that image exposure. The exposure time controller 333es is configured to control an image exposure timing used for a camera image.

With respect to the general configuration shown in FIG. 3A, the light source 330 may be a "coaxial" or other light source configured to emit the source light 332 (e.g., with strobed or continuous illumination) along a path including a beam splitter 390 (e.g., a partially reflecting mirror as part of a beam splitter) and through the objective lens 350 to a surface of the workpiece 320. The objective lens 350 receives the image light 355 (e.g., workpiece light) that is focused at an effective focus position EFP proximate to the workpiece 320, and outputs the image light 355 to the tube lens 351. The tube lens 351 receives the image light 355 and outputs it to the relay lens 352. In other implementations, analogous light sources may illuminate the field of view in a non-coaxial manner; for example, a ring light source may illuminate the field of view.

In various implementations, the objective lens 350 may be an interchangeable objective lens, and the tube lens 351 may be included as part of a turret lens assembly (e.g., similar to the interchangeable objective lens 250 and the turret lens assembly 223 of FIG. 2A). In the implementation shown in FIG. 3A, image light 355 arising from a nominal focal plane of the objective lens 350 is focused by the tube lens 351 to form an intermediate image at a nominal intermediate image plane IIPnom. When the TAG lens 370 is in a state where it provides no lensing effect (no optical power), the nominal focal plane of the objective lens 350, the nominal intermediate image plane IIPnom, and the image plane of the camera 360 form a set of conjugate planes, according to known microscope imaging principles. In various implementations, any of the other lenses referenced herein may be formed from or operate in conjunction with individual lenses, compound lenses, etc.

The relay lens 352 receives the image light 355 from the tube lens 351 (or more generally from an intermediate image plane, in various alternative microscope configurations) and outputs it to the TAG lens 370. The TAG lens 370 receives the image light 355 and outputs it to the relay lens 356. The relay lens 356 receives the image light 355 and outputs it to the camera 360. In various implementations, the camera 360 captures a camera image during an image exposure (e.g., during an integration period of the camera 360), and may provide the corresponding image data to a control system portion. Some camera images may include a workpiece image (e.g., of a region of the workpiece 320) provided during a workpiece image exposure. In some implementations, an image exposure (e.g., a workpiece image exposure) may be limited or controlled by a strobe timing of the light source 330 that falls within an image integration period of the camera 360. In various implementations, the camera 360 may have a pixel array greater than 1 megapixel (e.g., 1.3 megapixel, with a 1280×1024 pixel array, with 5.3 microns per pixel).

In the example of FIG. 3A, the relay lenses 352 and 356 and the VFL (TAG) lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. In various implementations, the illustrated 4f optical configuration permits placing the VFL (TAG) lens 370 (e.g., which may be a low numerical aperture (NA) device) at the Fourier plane of the objective lens 350. This configuration may maintain the telecentricity at the workpiece 320, and may minimize scale change and image distortion (e.g., including providing constant magnification for each effective focus position ($Z_L$-height) of the workpiece 320).

In various implementations, the lens controller 380 may include a drive signal generator portion 381, a timing clock 381', and imaging circuits/routines 382. The drive signal generator portion 381 may operate (e.g., in conjunction with the timing clock 381') to provide a periodic drive signal to the high speed VFL (TAG) lens 370 via a signal line 380'. In various implementations, the TAG lens system 300 (or optical assembly portion 205') may comprise a control system (e.g., the control system portion 120 of FIG. 2) that is configurable to operate in conjunction with the lens controller 380 for coordinated operations.

In various implementations, the lens controller 380 may generally perform various functions related to imaging a workpiece 320 in a manner synchronized with a desired phase timing of the TAG lens 370, as well as controlling, monitoring and adjusting the driving and response of the TAG lens 370. In various implementations, the image circuits/routines 382 perform standard imaging operations for the optical system, synchronized with the phase timings of the TAG lens 370.

In various instances, drift in the operating characteristics of the VFL lens may arise due to unwanted temperature variations. As shown in FIG. 3A, in various implementations, the TAG lens system 300 may optionally include a lens heater/cooler 337 associated with the TAG lens 370. The lens heater/cooler 337 may be configured to input an amount of heat energy into the TAG lens 370 and/or perform cooling functions to facilitate heating and/or cooling of the TAG lens 370 according to some implementations and/or operating conditions. In addition, in various implementations, a TAG lens monitoring signal may be provided by a temperature sensor 336 associated with the TAG lens 370 to monitor an operating temperature of the TAG lens 370.

With respect to the general operations of the TAG lens 370, in various implementations as described above, the lens controller 380 may rapidly adjust or modulate its optical power periodically, to achieve a high-speed VFL lens that periodically modulates its optical power at a TAG lens resonant frequency of 400 kHz, 250 kHz, 70 kHz, or 30 kHz, etc., i.e., at a high speed. As shown in FIG. 3A, by using the periodic modulation of a signal to drive the TAG lens 370, the effective focus position EFP of the TAG lens system 300 (that is, the focus position in front of the objective lens 350) may be rapidly moved within a range Refp (e.g., a focus range or an autofocus search range, etc.) bound by an effective focus position EFP1 (or EFPmax or peak focus distance Z1max+) corresponding to a maximum optical power of the TAG lens 370 in combination with the objective lens 350, and an effective focus position EFP2 (or EFPmin or peak focus distance Z1max−) corresponding to a maximum negative optical power of the TAG lens 370 in combination with the objective lens 350. In various implementations, the effective focus positions EFP1 and EFP2 may approximately correspond to phase timings of 90 degrees and 270 degrees, as will be described in more detail below in reference to FIG. 4. For purposes of discussion, the middle of the range Refp may be designated as EFPnom, and may approximately correspond to zero optical power of the TAG lens 370 in combination with the nominal optical power of the objective lens 350. According to this description, EFPnom may approximately correspond to the nominal focal length of the objective lens 350 in some implementations (e.g., which may correspond to a working distance WD of the objective lens 350).

As with the precision machine vision inspection system of FIG. 2A, the TAG lens system 300 of FIG. 3A is also associated with or includes an adjustment mechanism, which is configured to change a distance between the optical assembly portion 305 and a workpiece surface WPS1 of the workpiece 320 (e.g., utilizing a motor 294 similar to the configuration of FIG. 2A or similar mechanism) and to rotate the optical assembly portion 305 (e.g., utilizing the rotation mechanism 295) relative to the workpiece surface WPS1 of the workpiece 320. In the illustrated example of FIG. 3A, the adjustment mechanism includes the rotation mechanism 295 configured to rotate the optical assembly portion 305 (including the optical axis OA of the optical assembly portion 305) relative to the workpiece surface WPS1. As illustrated in FIG. 3A, the rotation mechanism 295 may be provided as part of the rotary stage 297, to which the optical assembly portion 305 is attached. Alternatively, a stage on which the workpiece 320 is placed may be configured as a rotary stage.

In the example of FIG. 3A, the adjustment mechanism has been controlled to move the optical assembly portion 305 to position the workpiece surface WPS1 within a focal Z autofocus range of the optical assembly portion 305. In the illustration of FIG. 3A, this may correspond to positioning the optical assembly portion 305 at a distance D-3A from a location on the workpiece surface WPS1. For example, the distance D-3A may nominally correspond to the working distance WD, which may correspond to a midpoint or other portion of the focal Z autofocus range (e.g., as may correspond to a portion or all of the range REFP). As illustrated in FIG. 3A, at the distance D-3A, all of the portions of the workpiece surface WPS1 are within the range REFP, and for which the autofocus process including capturing an image stack may be utilized to determine autofocus heights for different locations (e.g., at least three locations) of the workpiece surface WPS1. It will also be appreciated that the workpiece 320 and/or the optical assembly portion 305 has been positioned such that the workpiece surface WPS1 is within the field of view of the optical assembly portion 305. As will be described in more detail below, in the example of FIG. 3B, the workpiece 320 may similarly be positioned such that the workpiece surface WPS1 is within the field of view of the optical assembly portion 305, and for which the optical axis OA may be directed toward a similar or identical location on the workpiece surface WPS1 as illustrated in FIG. 3A (e.g., for which the workpiece stage or other motion mechanism may be utilized for positioning the workpiece 320 along $X_M$ and $Y_M$ axis directions of the machine coordinate system, etc.)

As with the precision machine vision inspection system of FIG. 2A, a method of the present disclosure may be implemented including: positioning the optical assembly portion 305 relative to the workpiece surface 320A (e.g., as controlled by the motion controller 332 and/or 332sn); capturing an image stack of the workpiece surface at multiple focal lengths (e.g., by controlling the VFL (e.g., TAG) lens 370 as controlled by the lens controller 380 and/or exposure time controller 333es and/or by moving the optical assembly portion 305 as controlled by the motion controller 332 and/or 332sn); determining an autofocus height for at least three locations of the workpiece surface WPS1 based on at least three corresponding ROIs of the image stack (e.g., for which a surface normal and corresponding adjustment information may be determined based on the calculated autofocus heights); controlling the adjustment mechanism to: rotate the optical assembly portion 305 relative to the workpiece surface WPS1 to nominally align the optical axis OA of the optical assembly portion 305 with the calculated surface normal SN of the workpiece surface WPS1; and adjust a distance between the optical assembly portion and the workpiece surface; and executing a defined operation on the workpiece surface WPS1.

Figure 3B:
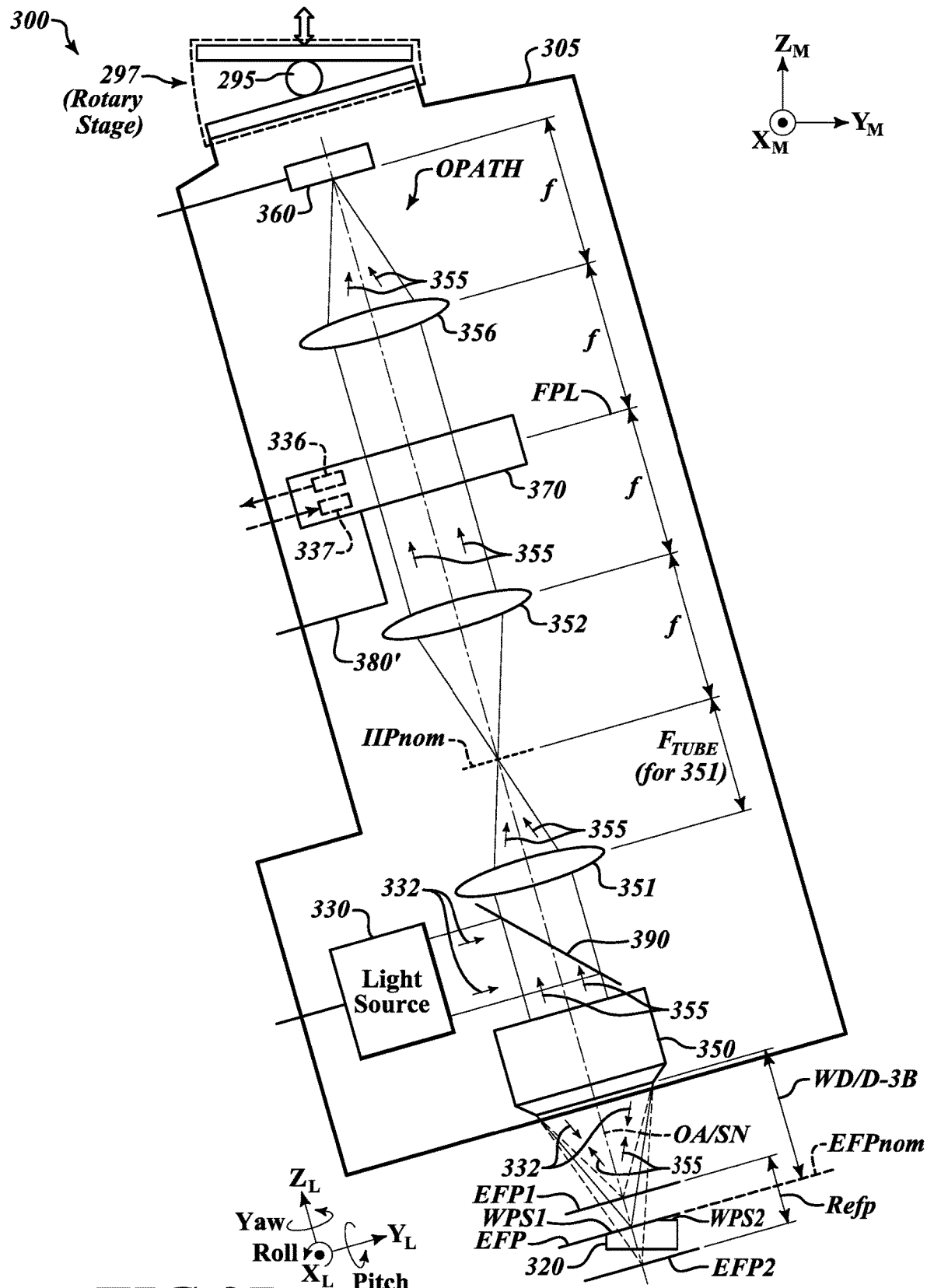
FIG. 3B is a schematic diagram of the VFL (TAG) lens system of FIG. 3A, which is controlled to orient the optical axis of the optical assembly portion to be nominally normal to the workpiece surface.

For example, FIG. 3B illustrates that, when the workpiece surface WPS1 of the workpiece 320 is tilted or otherwise oriented at an angle relative to a horizontal plane as shown, the adjustment mechanism including the rotation mechanism 295 may be used to (re-)orient the optical assembly portion 305 so as to nominally align the optical axis OA of the optical assembly portion 305 with a determined (e.g., calculated) surface normal SN of the workpiece surface WPS1. In addition, the adjustment mechanism (e.g., including the motor 294 or other corresponding mechanism) may be used to adjust a distance between the optical assembly portion 305 and the workpiece surface WPS1. As illustrated in FIG. 3B, the distance has been adjusted such that the distance D-3B between the optical assembly portion 305 and the workpiece surface WPS1 nominally corresponds to the working distance WD (e.g., which may be near or at the middle of the range REFP and/or may correspond to a best focus position, etc.). In particular in an implementation that does not include a VFL lens, or in an implementation where a VFL lens is included but is not being operated, the working distance WD of the objective lens 350 may correspond to a best focus position (i.e., at which the workpiece surface WPS1 will be in focus). In an implementation where a VLF lens 370 is included and operated, in some instances the working distance WD may be designated as corresponding to a general "focus position" of the optical assembly portion and/or may be designated as corresponding to a "best focus position" (e.g., as being near or at the middle of the range REFP of the operation of the VFL lens 370 and for which a phase timing corresponding to zero-optical power of the VFL lens 370 may correspond to the workpiece surface WPS1 being nominally in focus).

It will be appreciated that as the optical assembly portion 305 is rotated by the rotation mechanism 295 from the orientation of FIG. 3A to the orientation of FIG. 3B, the distance between the optical assembly portion 305 and the workpiece surface WPS1 will generally change during the rotation in accordance with trigonometric principles. Thus, even in an instance where the distance D-3B of FIG. 3B may be approximately the same as the distance D-3A of FIG. 3A, in accordance with the rotation, the adjustment mechanism will still adjust the distance between the optical assembly portion 305 and the workpiece surface WPS1 as part of the process for achieving the orientation and position illustrated in FIG. 3B. It will also be appreciated that in various implementations the distance D-3B may generally not be the same as the distance D-3A. More specifically, in accordance with the sloped orientation of the workpiece surface WPS1 in FIG. 3A, the surface location of the workpiece surface WPS1 that is intersected by the optical axis OA (i.e., and that is correspondingly at the distance D-3A) will be within the focal Z autofocus range, but may not be at a desired $Z_L$ position (e.g., at a desired focus position or otherwise, such as may correspond to the distance D-3B) relative to the optical assembly portion 305. In some instances, one or more other surface locations of the workpiece surface WPS1 in FIG. 3A may be at a desired $Z_L$ position, or none of the other surface locations may be at a desired $Z_L$ position (e.g., as corresponding to the distance D-3B). In accordance with the methods as described herein, in the example of FIG. 3A the autofocus process is utilized to determine autofocus heights for different locations (e.g., at least three locations) of the workpiece surface WPS1 (e.g., which thus define and indicate the location of the workpiece surface WPS1). Based at least in part on the determined autofocus heights, the adjustment mechanism rotates and adjusts the distance of the optical assembly portion relative to the workpiece surface, to be at an orientation and distance D-3B as illustrated in FIG. 3B (e.g., as corresponding to a desired $Z_L$ position, for which one or more, or none, of the locations of the workpiece surface WPS1 in FIG. 3A may have been at the distance D-3B or corresponding desired $Z_L$ position before the adjustments of FIG. 3B).

Figure 4:
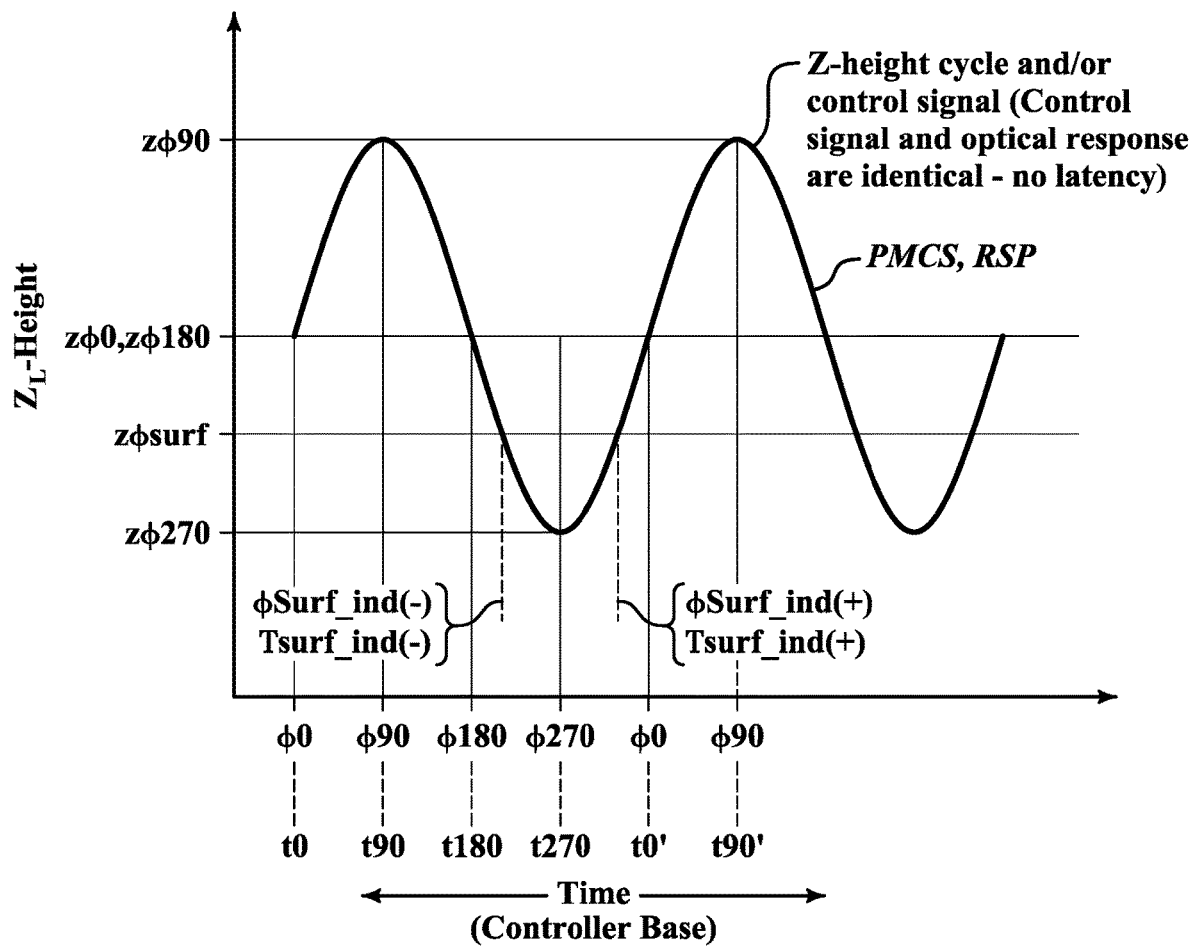
FIG. 4 is a timing diagram illustrating periodic modulation of the VFL (TAG) lens system of FIGS. 3A and 3B.

FIG. 4 is a timing diagram illustrating phase timings for a periodically modulated control signal PMCS and optical response RSP of the VFL lens system of FIGS. 3A and 3B. In the example of FIG. 4, an ideal case is illustrated in which the control signal PMCS and the optical response RSP have similar phase timings and are thus represented as identical signals, although for which it will be understood that in some instances the signals may be separated by a phase offset, as described in U.S. Pat. No. 9,736,355, which is commonly assigned and is hereby incorporated by reference herein in its entirety. In various implementations, the control signal PMCS may be related to the drive signal (e.g., including an amplitude driving signal) that is produced by the drive signal generator 381 of FIG. 3A, and the optical response RSP may be representative of the periodically modulated focus position of the optical assembly portion which is controlled by periodically modulating the optical power of the TAG lens 370, as outlined above.

In various implementations, the sinusoidal shapes of the curves PMCS and RSP may depend on the lenses in series (e.g., the objective lens 350, TAG lens 370, etc. as illustrated in FIGS. 3A and 3B), for which the optical power of the TAG lens 370 goes through a cycle as indicated in FIG. 4 and is equal to 1/f (where f=focal length). As will be described in more detail below, a $Z_L$-height versus phase calibration that relates respective $Z_L$-heights to respective phase timing signal values may be established by calibration according to known principles (e.g., in accordance with a mathematical model and/or by repeatedly stepping a surface to a known $Z_L$-height, and then manually or computationally determining the phase timing that best focuses an image at the known $Z_L$-height, and storing that relationship in a lookup table or the like in an effective focus position ($Z_L$-height vs. phase) calibration portion, such as may be included as part of the lens controller 380 or otherwise).

The timing diagram 400A illustrates phase timings (e.g., φ0, φ90, φ180, φ270, etc.) which are equal to respective phase timing signal values (e.g., t0, t90, t180, t270, etc.) of the control signal PMCS, which correspond to respective $Z_L$-heights (e.g., z$\phi$0, z$\phi$90, z$\phi$180, z$\phi$270, etc.) In various implementations, the phase timing signal values (e.g., t0, t90, t180, t270, etc.) may be determined according to a phase timing signal (e.g., as provided by a clock or other technique for establishing a timing relative to the periodic modulation, etc.) It will be understood that the phase timing signal values shown in the timing diagram are intended to be exemplary only and not limiting. More generally, any phase timing signal value will have an associated focus position $Z_L$-height within the illustrated range of focus positions (e.g., the range in the illustrated example having a maximum $Z_L$-height z$\phi$90 and a minimum $Z_L$-height z$\phi$270).

As described above, various techniques (e.g., as part of utilizing multi-point autofocus, points from focus, maximum confocal brightness determinations, etc.) may be used to determine when an imaged surface region is in focus, which may correspond to a $Z_L$-height measurement for the imaged surface region. For example, an imaged surface region may be determined to be at a $Z_L$-height z$\phi$surf when the imaged surface region is in focus. In the illustrated example utilizing the phase vs $Z_L$-height principles, at the phase timing $\phi$surf_ind(−), which is equal to the phase timing signal value Tsurf_ind(−), the focus position is at the $Z_L$-height z$\phi$surf, and a workpiece surface region located at the $Z_L$-height z$\phi$surf is in focus. Similarly, at the phase timing $\phi$surf_ind(+), which is equal to the phase timing signal value Tsurf_ind(+), the focus position is at the $Z_L$-height z$\phi$surf, and the workpiece surface region located at the $Z_L$-height z$\phi$surf is in focus. It will be appreciated that such values may be included in an effective focus position ($Z_L$-height vs. phase) calibration portion that relates respective $Z_L$-heights to respective phase timing signal values, such that when an imaged surface region is determined to be in focus, the corresponding phase timing signal value (e.g., Tsurf_ind(−)) may be utilized to look-up the corresponding measured $Z_L$-height (e.g., $Z_L$-height z$\phi$surf) of the imaged surface region.

In the illustrated example, the phase timing signal values Tsurf_ind(−) and Tsurf_ind(+) correspond to movements of the modulated focus position in respective opposite directions. More specifically, the phase timing signal value Tsurf_ind(−) corresponds to movement of the modulated focus position in a first direction (e.g., downward), while the phase timing signal value Tsurf_ind(+) corresponds to movement of the modulated focus position in a second direction (e.g., upward) that is opposite to the first direction.

FIG. 4 also qualitatively shows how strobed illumination (e.g., as controlled by the exposure time controller 333es of FIG. 3A) can be timed to correspond with a respective phase timing (e.g., $\phi$0, $\phi$90, $\phi$180, $\phi$270, etc.) of the periodically modulated focus position to expose an image focused at a respective $Z_L$-height (e.g., z$\phi$0, z$\phi$90, z$\phi$180, z$\phi$270, etc.). That is, in the illustrated example, while a digital camera is acquiring an image during an integration period, if a short strobe pulse is provided at the phase timing $\phi$0, then the focus position will be at the height z$\phi$0, and any workpiece surface that is located at the height z$\phi$0 will be in focus in the resulting image. The same will be true for the other exemplary phase timings and $Z_L$-heights shown in FIG. 4. In accordance with such principles, an image stack may be acquired with images captured as corresponding to different phase timings and thus corresponding to different $Z_L$ heights.

In accordance with such principles, the TAG lens system 300 is suited for rapidly performing an autofocus operation (e.g., a multi-point autofocus operation). Specifically, the TAG lens system 300 can be used to capture an image stack of a workpiece surface including surface locations while periodically modulating the optical power of the TAG lens 370 sweeping through the focal $Z_L$ range (e.g., a focal $Z_L$ autofocus range), and finding a best focus image which corresponds to the $Z_L$ height of a workpiece surface location. More specifically, as part of a multi-point autofocus process, at least three different regions of interest (ROIs) of the image stack can be analyzed to find at least three $Z_L$ heights of three corresponding workpiece surface locations (e.g., which in some implementations may be performed simultaneously), which can then be used to calculate/determine the workpiece surface (e.g., corresponding to a calculated plane or other representation) and to correspondingly calculate/determine a surface normal of the workpiece surface.

Figure 5A:
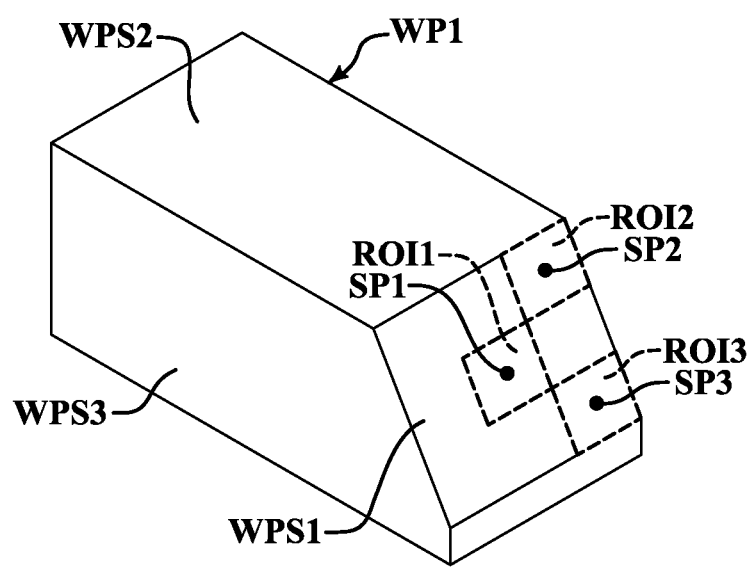
FIG. 5A illustrates a sample workpiece including first and second workpiece surfaces at different angular orientations.

FIG. 5A illustrates a sample workpiece WP1 having various workpiece surfaces WPS1, WPS2 and WPS3. In the example of FIG. 5A, in relation to a machine coordinate system (MCS), the workpiece surface WPS2 may be parallel to a horizontal plane, the workpiece surface WPS3 may be parallel to a vertical plane, and the workpiece surface WPS1 may be at a relatively angled orientation. On the workpiece surface WPS1, regions of interest ROI1, ROI2, and ROI3 are illustrated, each with a corresponding surface point SP1, SP2 and SP3, which may each be located at a relative center of each corresponding region of interest. As will be described in more detail below, the regions of interest may be representative of regions of interest in an image stack as part of an autofocus process, for which autofocus heights (e.g., $Z_L$ heights) for each of the corresponding surface points SP1, SP2 and SP3 may be determined (e.g., as may be utilized to determine a plane or other representation and a corresponding surface normal of the workpiece surface WPS1).

Figure 5B:
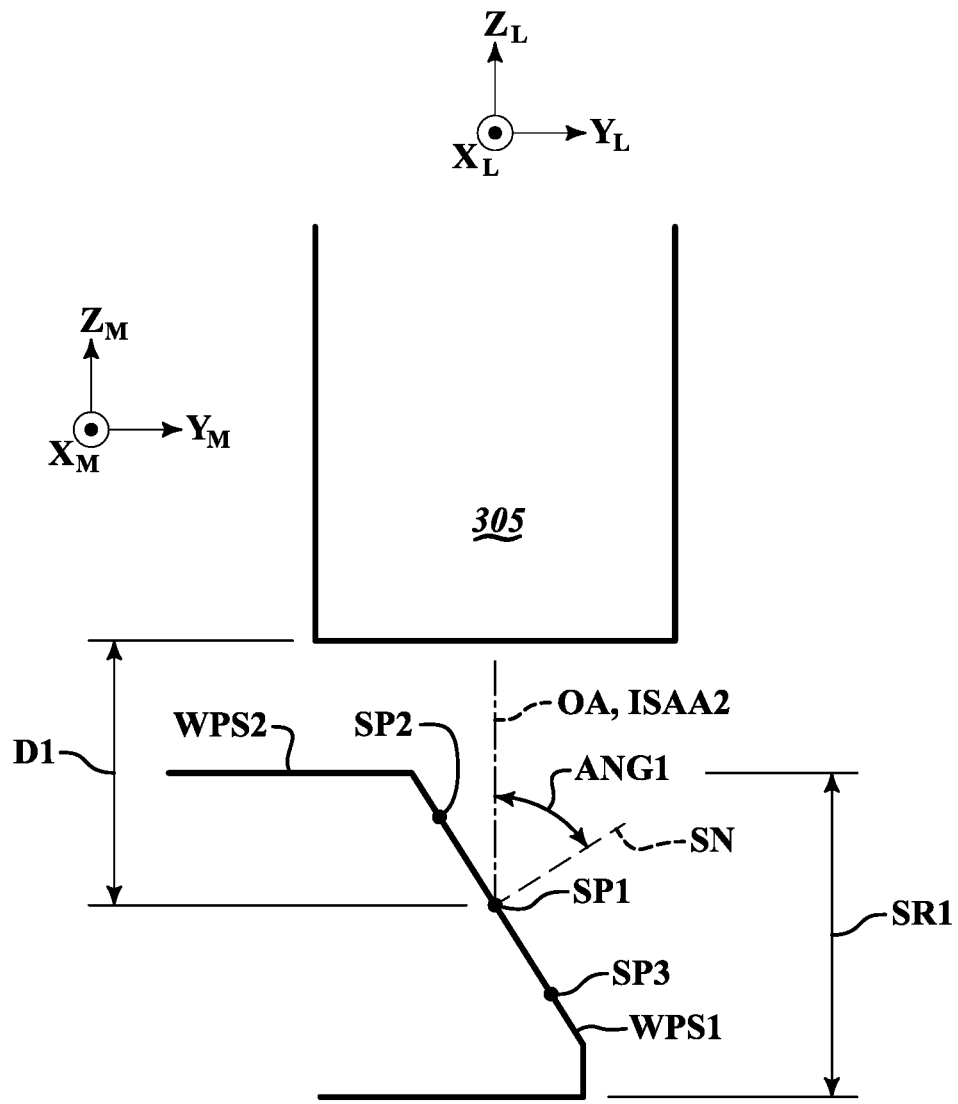
FIG. 5B is a schematic diagram of an optical assembly portion in an initial orientation in which a multi-point autofocus process may be performed to determine a surface normal for a workpiece surface.
Figure 5C:
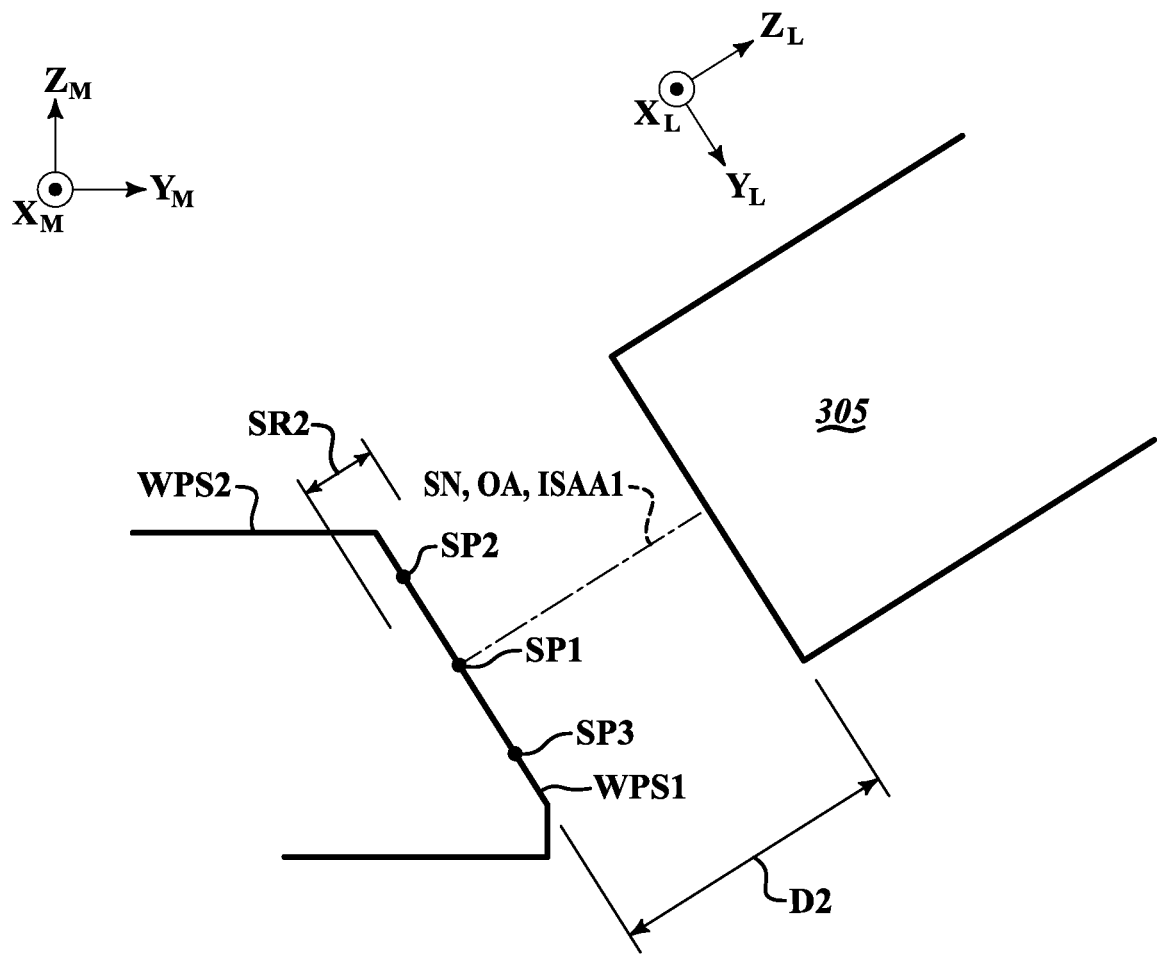
FIG. 5C is a schematic diagram illustrating the optical axis of the optical assembly portion of FIG. 5B, as oriented to be nominally normal to the workpiece surface.

FIG. 5B is a schematic diagram showing a distal end of the optical assembly portion 305 having its optical axis OA and image stack acquisition axis ISAA oriented generally in a vertical orientation relative to a surface (e.g., a stage) on which the workpiece WP1 is placed (i.e., with the optical axis OA parallel to the $Z_M$-axis of the MCS). FIG. 5C is a schematic diagram of the distal end of the optical assembly portion 305 having its optical axis OA and an image stack acquisition axis ISAA oriented at an angle so as to be approximately/nominally normal (i.e., perpendicular) to the angled workpiece surface WPS1 of the workpiece WP1.

In order to achieve the orientation of FIG. 5C, certain processes may be performed in accordance with principles disclosed herein. For example, the configuration of FIG. 5B may be achieved by controlling the adjustment mechanism to move the optical assembly portion 305 to place the workpiece surface WPS1 within a focal Z autofocus range of the optical assembly portion 305 (i.e., a $Z_L$ autofocus range). In the illustration of FIG. 5B, this may correspond to positioning the optical assembly portion 305 at a distance D1 from a location on the workpiece surface WPS1 (e.g., a location where the optical axis OA intersects the workpiece surface WPS1, which in some instances may generally be at a midpoint or other central location of the workpiece surface WPS1). In the example of FIG. 5B, the focal $Z_L$ autofocus range is represented by a range SR1. As will be described in more detail below with respect to FIGS. 6A and 6B, as part of the autofocus process, an image stack may be captured of the workpiece surface WPS1 within the focal $Z_L$ autofocus range using the optical assembly portion 305. An autofocus height may be determined for each of at least three locations (e.g., surface points SP1, SP2 and SP3) of the workpiece surface WPS1 based on the at least three corresponding regions of interest ROI1, ROI2 and ROI3 of the image stack, as will also be described in more detail below with respect to FIGS. 6A and 6B. As illustrated in FIG. 5B, a surface normal SN of the workpiece surface WPS1 is at an angle ANG1 relative to the optical axis OA of the optical assembly portion 305.

As illustrated in FIG. 5C, the adjustment mechanism may be controlled based at least in part on the autofocus heights at the at least three locations (e.g., surface points) of the workpiece surface WPS1 to: rotate the optical assembly portion 305 relative to the workpiece surface WPS1 to nominally align the optical axis OA of the optical assembly portion 305 with the surface normal SN of the workpiece surface WPS1; and adjust a distance between the optical assembly portion 305 and the workpiece surface WPS1 (e.g., to be at a distance D2). In various implementations, prior to the controlling of the adjustment mechanism as illustrated in FIG. 5C, the determined autofocus heights for the surface points SP1, SP2 and SP3 may be used for calculating or otherwise determining the surface normal SN of the workpiece surface WPS1. For example, the three surface points SP1, SP2 and SP3 may be determined to geometrically define a plane (or other representation) which corresponds to the workpiece surface WPS1, and for which a surface normal SN may be correspondingly calculated and/or otherwise determined as normal (i.e., perpendicular) to the calculated/determined plane (or other representation). Once such a surface normal SN is determined, adjustment information may be calculated or otherwise determined, that may be utilized for controlling the adjustment mechanism to rotate and otherwise move the optical assembly portion 305 from the orientation illustrated in FIG. 5B to be in the orientation illustrated in FIG. 5C (e.g., as rotated by the amount of the angle ANG1), for which the optical axis OA is shown to nominally coincide with the surface normal SN. In addition, the adjustment mechanism (e.g., including the motor 294 or other corresponding mechanism) may be used to adjust the distance between the optical assembly portion 305 and the workpiece surface WPS1. As illustrated in FIG. 5C, the adjustment has resulted in the distance D2 between the optical assembly portion 305 and the workpiece surface WPS1. As described above with respect to FIGS. 3A and 3B, in various implementations the distance D2 may correspond to the workpiece surface WPS1 being at a desired $Z_L$ location (e.g., being nominally at or near: a middle of the range SR2; and/or a working distance of an objective lens of the optical assembly portion 305; and/or a best focus position, etc.).

Once in the orientation and position illustrated in FIG. 5C, a defined operation may be executed on the workpiece surface WPS1. For example, a measurement operation, utilizing the optical assembly portion 305, may be performed on the workpiece surface WPS1. As part of such processes or otherwise, a points from focus operation may be performed (e.g., for determining a surface profile) on the workpiece surface WPS1. As part of a points from focus operation, an image stack may be captured with the optical assembly portion 305 in the orientation illustrated in FIG. 5C. In various implementations, the process may be repeated/continued (e.g., for executing the defined operation on other portions of the workpiece surface WPS1 or on other workpiece surfaces of the workpiece WP1), for which the optical assembly portion 305 may be rotated, from the orientation illustrated in FIG. 5C to be nominally normal to another portion of the workpiece surface or another surface of the workpiece (e.g., for following and measuring different portions of a workpiece, such as a turbine blade that continues to curve, etc.)

As an additional aspect, FIGS. 5B and 5C may be understood to illustrate a required scan range (of FIG. 5C, for example, as compared to FIG. 5B) for covering a 3-dimensional surface topography of the workpiece surface WPS1, depending on the orientation of the optical assembly portion 305 relative to the workpiece surface WPS1 to be measured. For example, the scan range SR1 with the orientation of FIG. 5B is significantly larger, so as to be able to cover the 3-dimensional surface topography of the workpiece surface WPS1, as compared to the scan range SR2 with the orientation of FIG. 5C. Thus, adjusting the angle/orientation of the optical assembly portion 305 as in FIG. 5C, so that the optical axis OA is nominally normal (i.e., approximately perpendicular) to the workpiece surface WPS1, may be technically advantageous in reducing the required scan range, which in turn may shorten the scanning time and/or reduce the number of images required to form an image stack (e.g., with a desired density of images, etc.)

As illustrated in FIG. 5B, in addition to the scan range SR1 for an image stack being significantly larger than the scan range SR2 of FIG. 5C, the orientation of the optical assembly portion 305 is at a relatively sharp angle relative to the workpiece surface WPS1, which may reduce the imaging quality or prevent the imaging of certain portions/aspects of certain workpiece features. For example, the sharp angle may reduce the quality of the imaging due to less of the imaging light being reflected back toward the optical assembly portion 305, etc. In contrast, in FIG. 5C, by orienting the optical assembly portion 305 to be nominally normal (i.e., approximately perpendicular) to at least a portion of the workpiece surface WPS1, the optical assembly portion 305 may have a better angle for imaging the workpiece surface WPS1 (e.g., having a better angle for reflected imaging light and/or being able to better view certain workpiece features, etc.)

In various implementations, as noted above, it may also be desirable to continue to rotate/adjust the optical assembly portion 305 to be in different orientations for performing processes on different workpiece surfaces of a workpiece or different portions of workpiece surfaces. For example, the workpiece WP1 in FIGS. 5A-5C is noted to include the workpiece surfaces WPS1, WPS2 and WPS3. In one implementation, the optical assembly portion 305 may initially be (or may be adjusted to be) positioned/oriented as illustrated in FIG. 5B (e.g., with the optical axis OA having a 0 degree tilt relative to the vertical orientation and nominally normal to the workpiece surface WPS2) for performing certain operations (e.g., a measurement operation, acquiring an image stack for PFF scanning, etc.) on the workpiece surface WPS2. Then, a process as disclosed herein may be performed, including performing multi-point autofocus on the workpiece surface WPS1 and rotating the optical assembly portion 305 so that the optical axis OA is oriented as illustrated in FIG. 5C (e.g., with a 45 degree tilt relative to vertical and nominally normal to the workpiece surface WPS1) for performing certain operations (e.g., a measurement operation, acquiring an image stack PFF for scanning, etc.) on the workpiece surface WPS1. Then, a process as disclosed herein may again be performed, including moving the optical assembly portion to position the workpiece surface WPS3 within the focal Z autofocus range and performing multi-point autofocus on the workpiece surface WPS3 and rotating the optical assembly portion 305 so that the optical axis OA is oriented (e.g., with a 90 degree tilt relative to vertical and nominally normal to the workpiece surface WPS3) for performing certain operations (e.g., to perform a measurement operation, to acquire an image stack for PFF scanning, etc.) on the workpiece surface WPS3. In various implementations, a process as disclosed herein may also have initially been performed to achieve the orientation of FIG. 5B (e.g., with the optical axis OA nominally normal to the workpiece surface WPS2 and for which a designated operation may be executed (i.e. performed) on the workpiece surface WPS2).

It will be appreciated that in various implementations as part of such processes, the optical axis OA of the optical assembly portion 305 may be nominally normal (i.e., approximately perpendicular) to only a portion of the workpiece surface, or in some instances may not actually be nominally normal (i.e., approximately perpendicular) to any particular portion of the workpiece surface but instead nominally normal only to a general overall or average (e.g., calculated), etc. orientation of the workpiece surface. For example, if the workpiece surface is particularly uneven and/or includes numerous workpiece features forming a complicated or otherwise uneven 3-dimensional profile/surface topography, the optical axis OA may not be precisely or nominally normal/perpendicular to any particular portion of the workpiece surface, but may be approximately/nominally normal/perpendicular to an overall, average and/or general (e.g., calculated), etc. orientation or principle angle of the workpiece surface, for which the optical axis OA may be said to be nominally normal to the workpiece surface, as described herein.

Figure 6A:
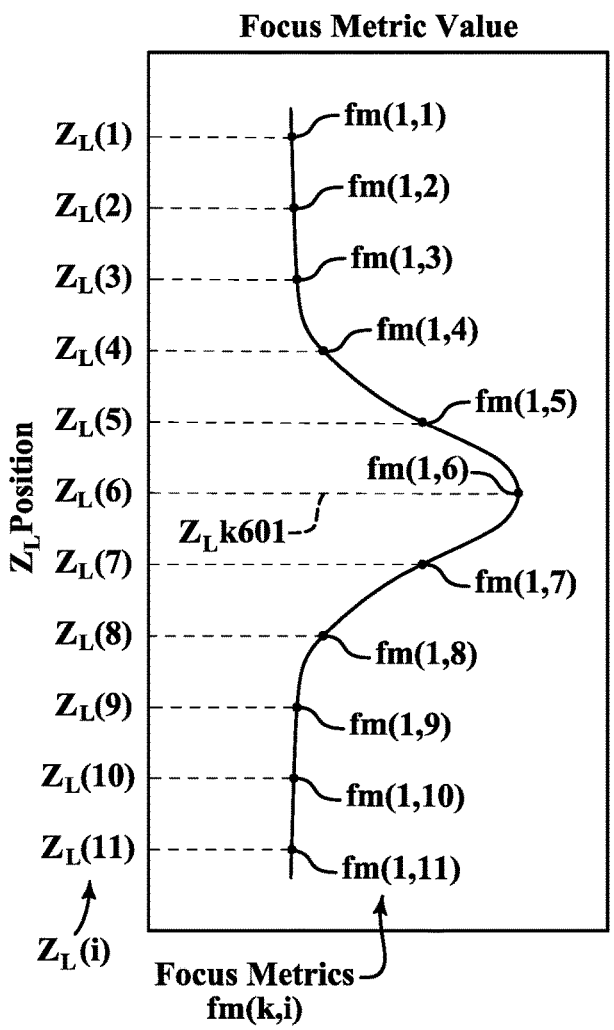
FIGS. 6A and 6B illustrate an image stack and a corresponding focus curve which may be used as part of a multi-point autofocus process to determine a surface normal of a workpiece surface.
Figure 6B:
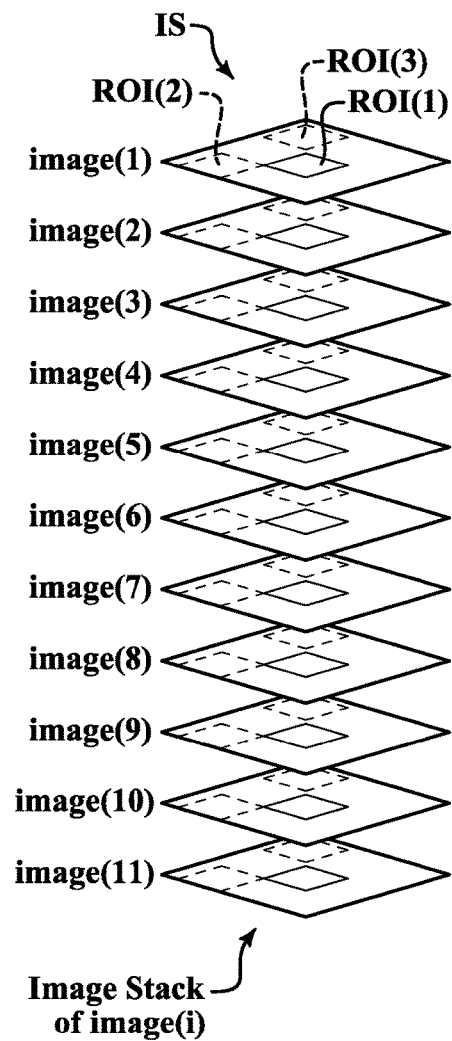

FIGS. 6A and 6B illustrate how an image stack, including images at varying focal lengths, obtained by the optical assembly portion 205 or 305 may be utilized to determine an autofocus height (i.e., an autofocus position or $Z_L$ position or $Z_L$ height) of at least three points on a workpiece surface, along a $Z_L$-axis. As used herein, "$Z_L$-axis" may correspond to the Z axis of the local coordinate system (LCS) of the optical assembly portion 205 or 305 (i.e., corresponding to the optical axis OA of the optical assembly portion 205 or 305). In various implementations, the image stack IS may be obtained by the optical assembly portion 205 or 305 operating in a multi-point autofocus mode (e.g., and/or other modes, such as PFF, etc.), to determine an autofocus height (i.e., a $Z_L$-height or $Z_L$-position) of at least three locations (e.g., surface points) of the workpiece surface (e.g., in an orientation such as that illustrated in FIG. 5B).

Specifically, FIGS. 6A and 6B illustrate operations associated with determining, for each of one or more points on a surface of a workpiece, a relative $Z_L$-position (i.e., autofocus height) along an optical axis direction (i.e., coinciding with the $Z_L$-axis of the optical assembly portion 205 or 305). As indicated in FIGS. 6A and 6B, a focus position of the optical assembly portion 205 or 305 may be moved through a range of positions $Z_L(i)$ along a direction of an optical axis and/or an image stack acquisition axis, which may correspond to the focusing axis at each image acquisition position. The optical assembly portion 205 or 305 may capture an image(i) at each position $Z_L(i)$. For each captured image (i), a focus metric fm(k,i) may be calculated based on a region or sub-region of interest ROI(k) (e.g. a set of pixels) in the image (e.g., with the corresponding surface point at the center of the region or sub-region of interest ROI(k)). The focus metric fm(k,i) is related to the focus position of the optical assembly portion 205 or 305 (e.g., in accordance with a phase timing of the VFL lens 270 or 370 and/or a distance to the workpiece surface), along the direction of the optical axis and/or image stack acquisition axis at the time that the image(i) was captured. This results in focus curve data (e.g. a set of the focus metrics fm(k,i) at the positions $Z_L(i)$, which is one type of focus peak determining data set), which may be referred to simply as a "focus curve" or "autofocus curve". In one embodiment, the focus metric values may involve a calculation of the contrast or sharpness of the region of interest in the image.

The $Z_L$-position (e.g. $Z_L$k601 in FIG. 6A) corresponding to the peak of the focus curve, which corresponds to the best focus position along the image stack acquisition axis, is the $Z_L$ position for the region of interest used to determine the focus curve. It will be appreciated that while the image stack is shown for purposes of illustration as including eleven images (image(1)-image(11)), in an actual embodiment a smaller or larger number of images may be utilized. For example, certain autofocus processes may typically acquire image stacks including 5-10 images, in comparison to certain PFF processes which may acquire image stacks including over 200 images. In addition, the images of an image stack may be smaller of larger (e.g., including fewer or more regions of interest of a given size), depending on the implementation (e.g., as may be related to the size of the field of view of the camera and/or other factors).

As indicated by the autofocus curve generated for images (1)-(11), in the illustrated example, image(6) (i.e., with the corresponding focus metric fm(1,6)) appears to be close to or at the best focus. For example, a feature in the middle of ROI(1) (e.g., at surface point SP1 in FIG. 5A) would appear to be most in focus in image(6), as compared to in other images where that portion of the workpiece surface would appear to be progressively more out of focus in images further from image(6), and may appear more and more blurred. When a focus metric value is based on contrast as noted above, one method includes comparing a central pixel of an ROI (e.g., corresponding to surface point SP1) with its neighboring pixels in the ROI in terms of color/brightness, etc. By finding the image with the highest overall contrast, which corresponds to a focus position of when the image was acquired, an indication/measurement of the relative $Z_L$-position (i.e., autofocus height) of a surface point (e.g., surface point SP1 at the center of the ROI(1)) can be obtained along the optical axis OA and the image stack acquisition axis.

In FIG. 6B as described above, a central region of interest ROI(1) is deemed to be approximately in focus at image(6), which corresponds to position $Z_L(6)$ along the optical axis of the optical assembly portion 205 or 305. Thus, the surface point (e.g., surface point SP1) on the workpiece surface that corresponds to the center of the ROI(1) may be determined to be at the relative position $Z_L(6)$, as approximately corresponding to the focus position of ROI(1) in image(6) in the image stack. Similar processing may be performed for each of regions of interest ROI(2) and ROI(3), to determine the relative $Z_L$ positions of the surface points that correspond to the center of the ROI(2) and the ROI(3) (e.g., surface points SP2 and SP3, respectively). Specifically, autofocus curves, as shown in FIG. 6A, may be generated for the ROI(2) and the ROI(3) to find the best focus images in the respective regions of interest ROI. Assuming, for example, image(5) appears to be at the best focus in the ROI(2), and image(7) appears to be at the best focus in the ROI(3), then it can be determined that the autofocus height of the surface location at the center of the ROI(2) is $Z_L(5)$, and the autofocus height of the surface location at the center of the ROI(3) is $Z_L(7)$.

The $Z_L$ heights/autofocus heights ($Z_L$ positions) of the three regions of interest, ROI(1), ROI(2), and ROI(3) (e.g., with the corresponding central surface points SP1, SP2 and SP3), can be used to define a plane or other representation that corresponds to a surface that includes or is otherwise representative of the $Z_L$ positions/surface points, and a surface normal SN to the defined/determined surface can be calculated/determined. As noted previously, at least three $Z_L$ positions (i.e., autofocus heights) may be calculated/determined to define a surface, though more than three $Z_L$ positions may be obtained to more precisely define the surface. In various implementations, multiple regions of interest, ROI(1), ROI(2), ROI(3) . . . ROI(n), may be processed based on a same (single) image stack, for which in some instances there may be no need to obtain multiple image stacks for calculating/determining multiple $Z_L$ positions. It will be appreciated that a determined peak focus position (i.e., corresponding to an autofocus height) in some instances may fall between two images in an image stack, for which the focus peak position may be determined by interpolation or other techniques in accordance with the fitting of the focus curve to the focus metric values determined for the images.

In various implementations, the illustrations of FIGS. 6A and 6B may also be representative of an image stack that is obtained by the optical assembly portion 205 or 305 operating in a points-from-focus (PFF) mode (or other mode), to determine $Z_L$-heights (i.e., $Z_L$-positions) of multiple surface points of the workpiece surface. The PFF image stack may be processed to determine or output a $Z_L$ height coordinate map (e.g. a point cloud) that quantitatively indicates a set of 3 dimensional surface coordinates (e.g., corresponding to a surface shape or profile of the workpiece). As compared to a multi-point autofocus image stack, a PFF image stack may generally contain more images and involve calculations/determinations for more surface points (e.g., for a precise determination of a detailed surface profile, etc.), and may correspondingly involve more time consuming processes. For example, in some implementations a PFF image stack may include at least 10×, 20×, or 40×, etc. more images than a multi-point autofocus image stack (e.g., as some specific example values in certain implementations a multi-point autofocus image stack may include 5-10 images/camera frames while a PFF image stack may include over 200 (e.g., 220, etc.) images/camera frames). In accordance with principles disclosed herein, a multi-point autofocus image stack (e.g., captured with fewer images and less surface points and corresponding processing) may be acquired and processed relatively quickly, in relation to nominally aligning an optical axis of the optical assembly portion with a surface normal of the workpiece surface. Thereafter, with the optical assembly portion so aligned, a defined operation may be executed on the workpiece surface (e.g., including a PFF operation, etc.). The PFF operation may provide more detailed information regarding a surface profile of the workpiece surface, for which having the optical axis nominally aligned with the surface normal may have various advantages (e.g., with respect to performing the PFF and/or other processes).

Figure 7:
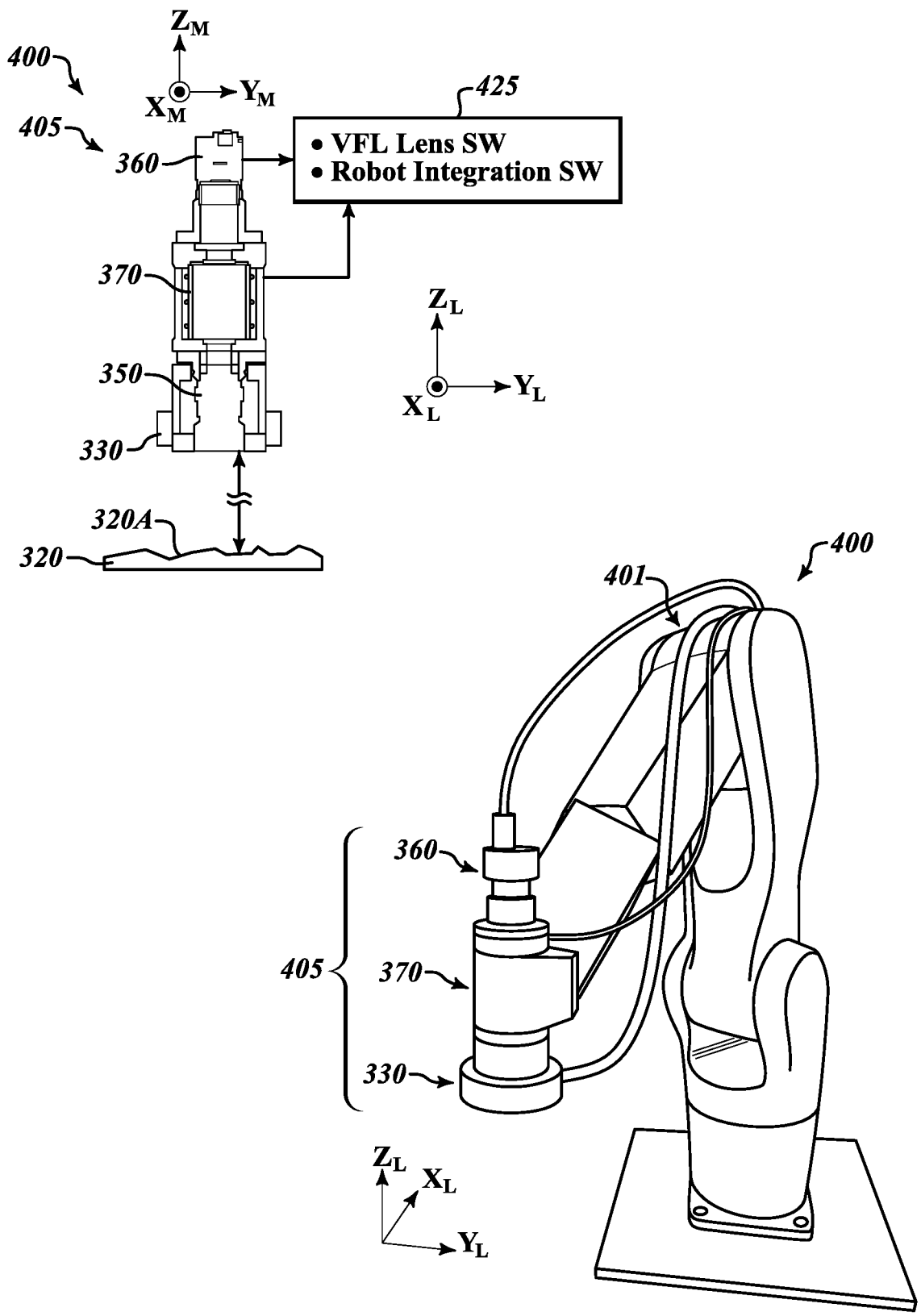
FIG. 7 illustrates a robot system, which embodies a metrology system including an optical assembly portion according to one aspect of the present disclosure.

FIG. 7 is a robot system 400, which embodies the metrology system of the present disclosure including an optical assembly portion 405 (similar to the optical assembly portions 205 and 305) according to one aspect of the present disclosure. The robot system 400 includes an adjustment mechanism 401 in the form of an articulated arm having multiple degrees of freedom. In various implementations, the adjustment mechanism 401 (i.e., the articulated arm) may generally function (e.g., including operations of certain portions of the articulated arm) as a Z-axis movement mechanism configured to change a distance between the optical assembly portion 405 and a workpiece surface 320A, and may also generally function (e.g., including operations of certain portions of the articulated arm) as a rotation mechanism configured to rotate the optical assembly portion to change angular orientation of the optical axis relative to the workpiece surface 320A.

The optical assembly portion 405 includes a camera 360, a VFL (TAG) lens 370, and an illumination source 330. In various implementations, the illumination source 330 may be a ring light (e.g., as formed from an arrangement of LEDs) provided at the distal end of the optical assembly portion 405 in the illustrated embodiment, though the illumination source 330 may be, instead, a coaxial light for example. The robot system 400 includes a controller 425 including or coupled to VFL (TAG) lens control software and robot integration software responsible for controlling the optical assembly portion 405 incorporated in the robot system 400. In the illustrated embodiment, the optical assembly portion 405 is coupled to the distal end of the articulated arm 401. The controller 425 of the robot system 400, by controlling the articulated arm 401, can move the optical assembly portion 405 to change the distance to the workpiece surface 320A (e.g., utilizing the Z-axis movement mechanism portions of the articulated arm 401), and can rotate the optical assembly portion 405 to change an angular orientation of the optical axis OA of the optical assembly portion 405 relative to the workpiece surface 320A (e.g., utilizing the rotation mechanism portions of the articulated arm 401).

As with the embodiments of FIGS. 2A-3B described above, the controller 425 of the robot system 400 may implement a method of the present disclosure including: positioning the optical assembly portion 405 so that the workpiece surface 320A is within an autofocus range; capturing an image stack of the workpiece surface at multiple focal lengths within the autofocus range (e.g., by controlling the TAG lens 370 and/or moving the optical assembly portion 405); determining an autofocus height for at least three locations of the workpiece surface based on at least three corresponding ROIs of the image stack (e.g., for which a surface normal and adjustment information may be determined based on the determined autofocus heights); controlling the adjustment mechanism based at least in part on the determined autofocus heights to: rotate the optical assembly portion relative to the workpiece surface to nominally align the optical axis of the optical assembly portion 405 with a surface normal of the workpiece surface 320A; and adjust a distance between the optical assembly portion and the workpiece surface; and executing a defined operation on the workpiece surface 320A.

Figure 8A:
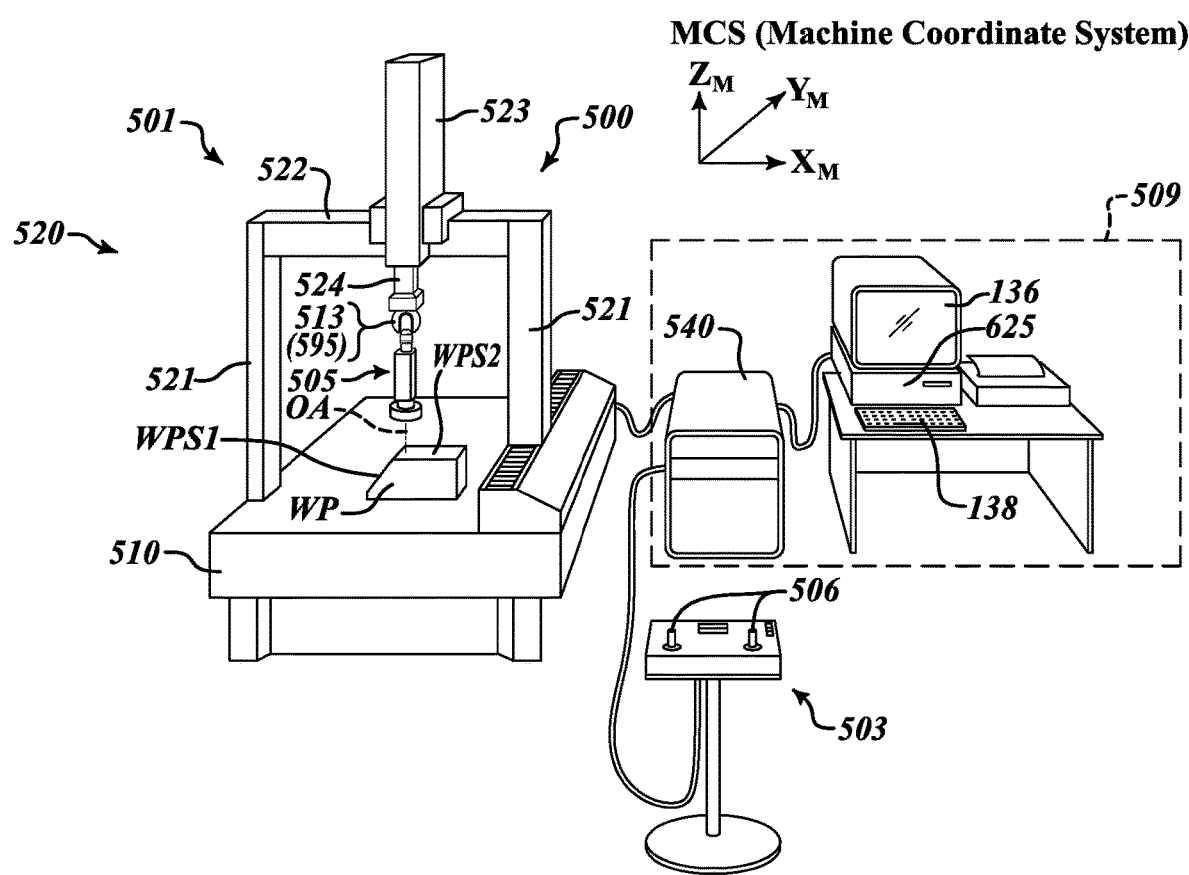
FIG. 8A illustrates a coordinate measuring machine (CMM), which embodies a metrology system including an optical assembly portion according to one aspect of the present disclosure.

FIGS. 8A-8E illustrate a coordinate measuring machine (CMM) 500, which embodies the metrology system including an optical assembly portion 505 according to another aspect of the present disclosure. As shown in FIG. 8A, the coordinate measuring machine 500 includes a machine body 501 that moves the optical assembly portion 505 (e.g., as may be included in a vision probe), an operation unit 503 having manually-operated joysticks 506, and a processing device configuration 509. The machine body 501 includes a surface plate 510 (e.g., a workpiece stage) and an adjustment mechanism 520 (see also FIG. 8E) that moves the optical assembly portion 505. The adjustment mechanism 520 includes an X-axis slide mechanism 525, a Y-axis slide mechanism 526, and a Z-axis slide mechanism 527 that are provided to stand on the surface plate 510 for holding and three-dimensionally moving the optical assembly portion 505 relative to the workpiece WP to be measured as shown in FIG. 8A. The adjustment mechanism 520 also includes a rotation mechanism 595.

Specifically, the adjustment mechanism 520 includes beam supports 521 capable of moving in a $Y_M$ direction in a machine coordinate system (MCS), a beam 522 bridged between the beam supports 521, a column 523 capable of moving in an $X_M$ direction in the machine coordinate system on the beam 522, and a Z-axis movement member 524 (e.g., a spindle) capable of moving in a $Z_M$ direction in the machine coordinate system inside the column 523 as shown in FIG. 8A. The X-axis slide mechanism 525, the Y-axis slide mechanism 526, and the Z-axis slide mechanism 527 shown in FIG. 8A are provided between the beam 522 and the column 523, between the surface plate 510 and the beam supports 521, and between the column 523 and the Z-axis movement member 524, respectively. The optical assembly portion 505 is attached to a probe head 513, which may include the rotation mechanism 595 and which is attached to and supported by an end of the Z-axis movement member 524. The rotation mechanism 595 enables the optical assembly portion 505 to be rotated. The X-axis slide mechanism 525, the Y-axis slide mechanism 526, and the Z-axis slide mechanism 527 are each configured to move the optical assembly portion 505 in the mutually orthogonal X, Y, Z-axis directions, respectively, within the MCS (i.e., $X_M$, $Y_M$ and $Z_M$ directions).

Figure 8B:
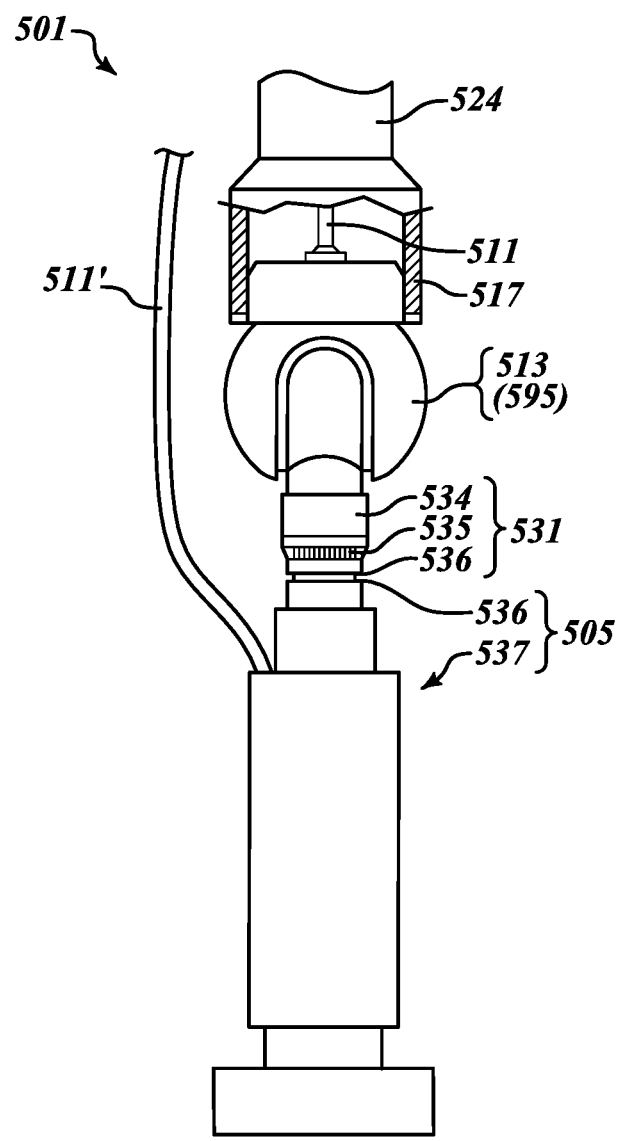
FIG. 8B is a diagram schematically illustrating an optical assembly portion coupled to a probe head of a CMM such as that illustrated in FIG. 8A.
Figure 8C:
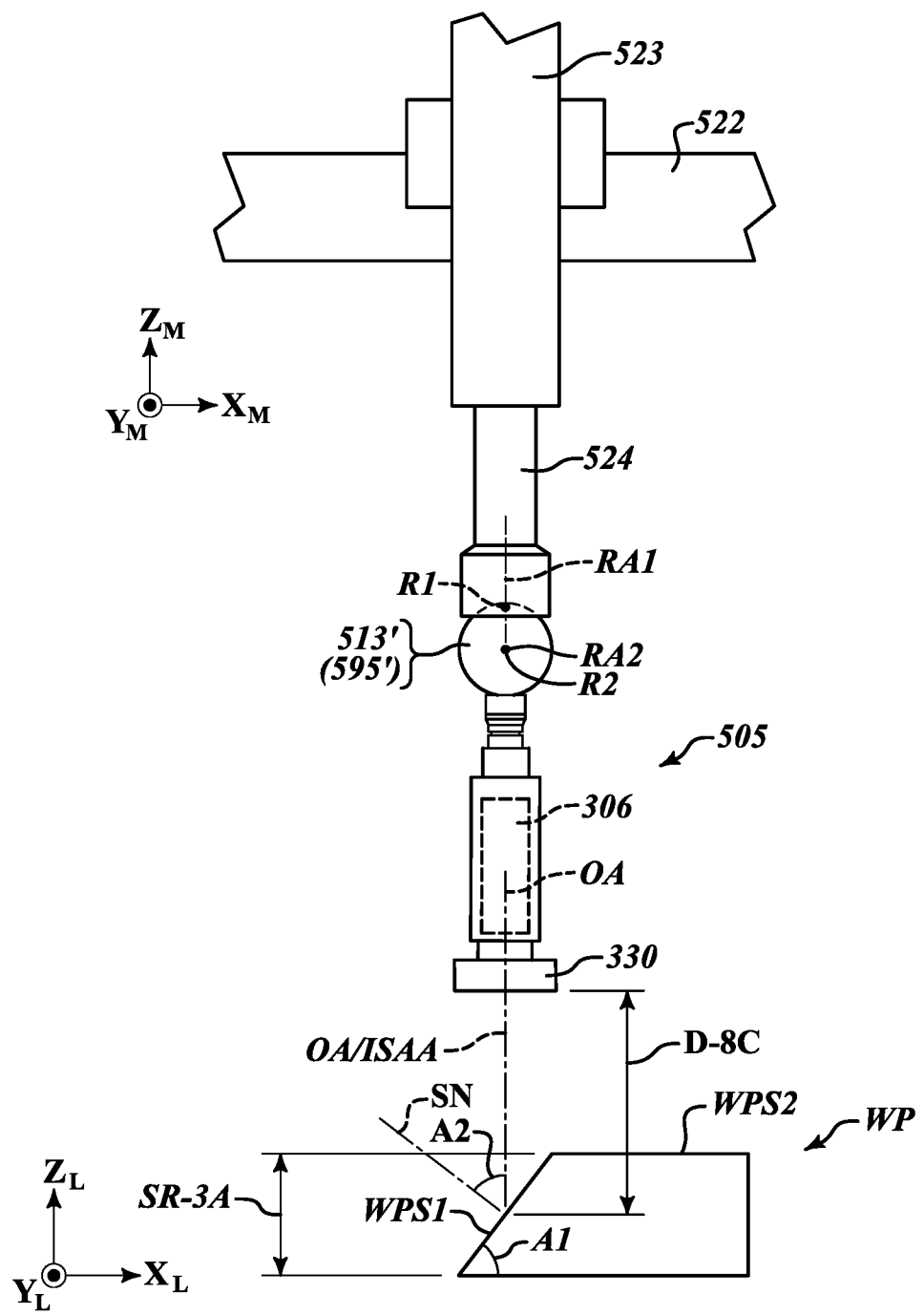
FIG. 8C is a schematic diagram of a portion of the CMM of FIG. 8A in which an optical assembly portion is in an initial orientation in which a multi-point autofocus process may be performed to determine a surface normal for a workpiece surface.
Figure 8D:
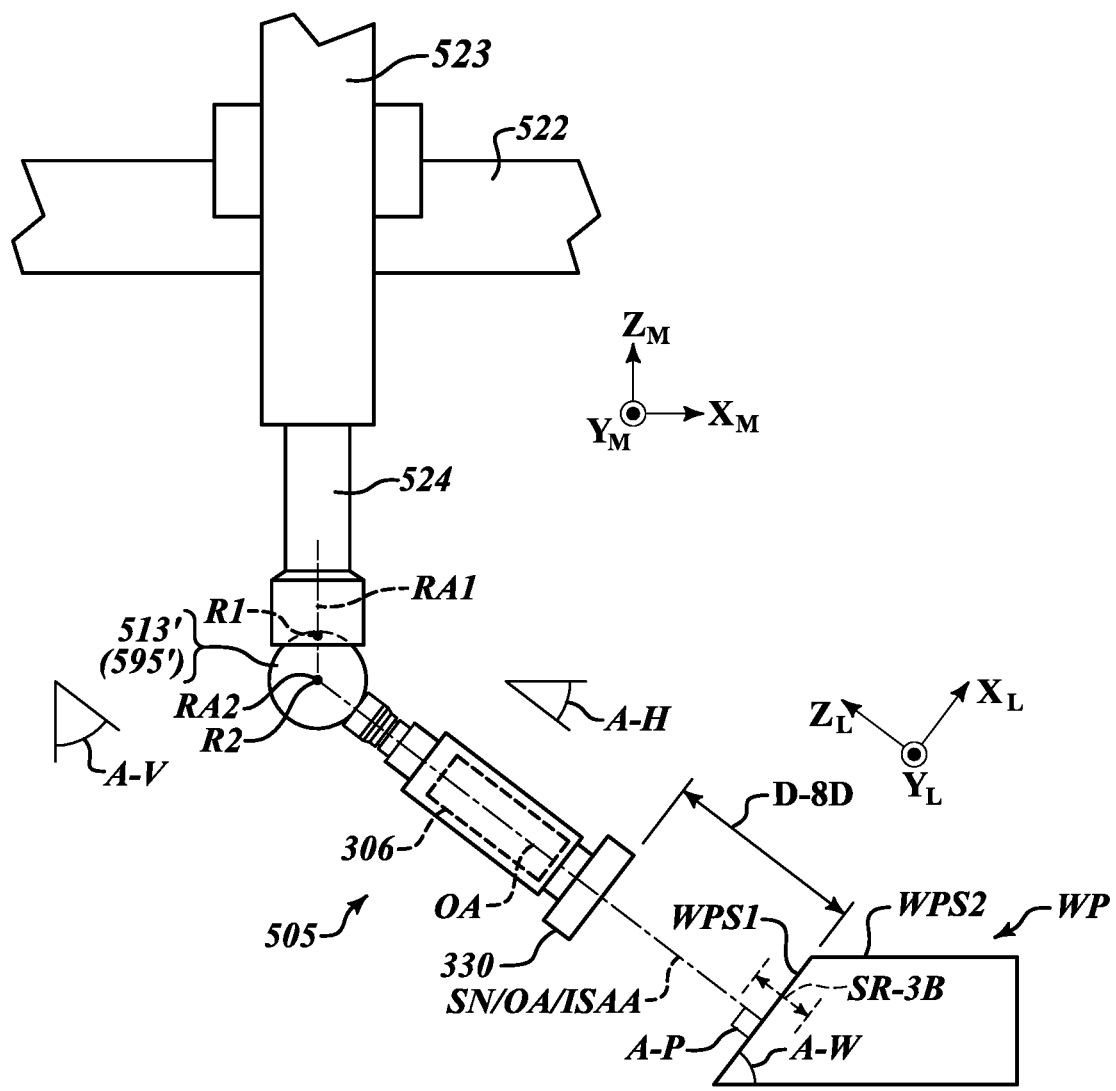
FIG. 8D is a schematic diagram of a portion of the CMM of FIG. 8A illustrating the optical axis of the optical assembly portion as oriented to be nominally normal to the workpiece surface.
Figure 8E:
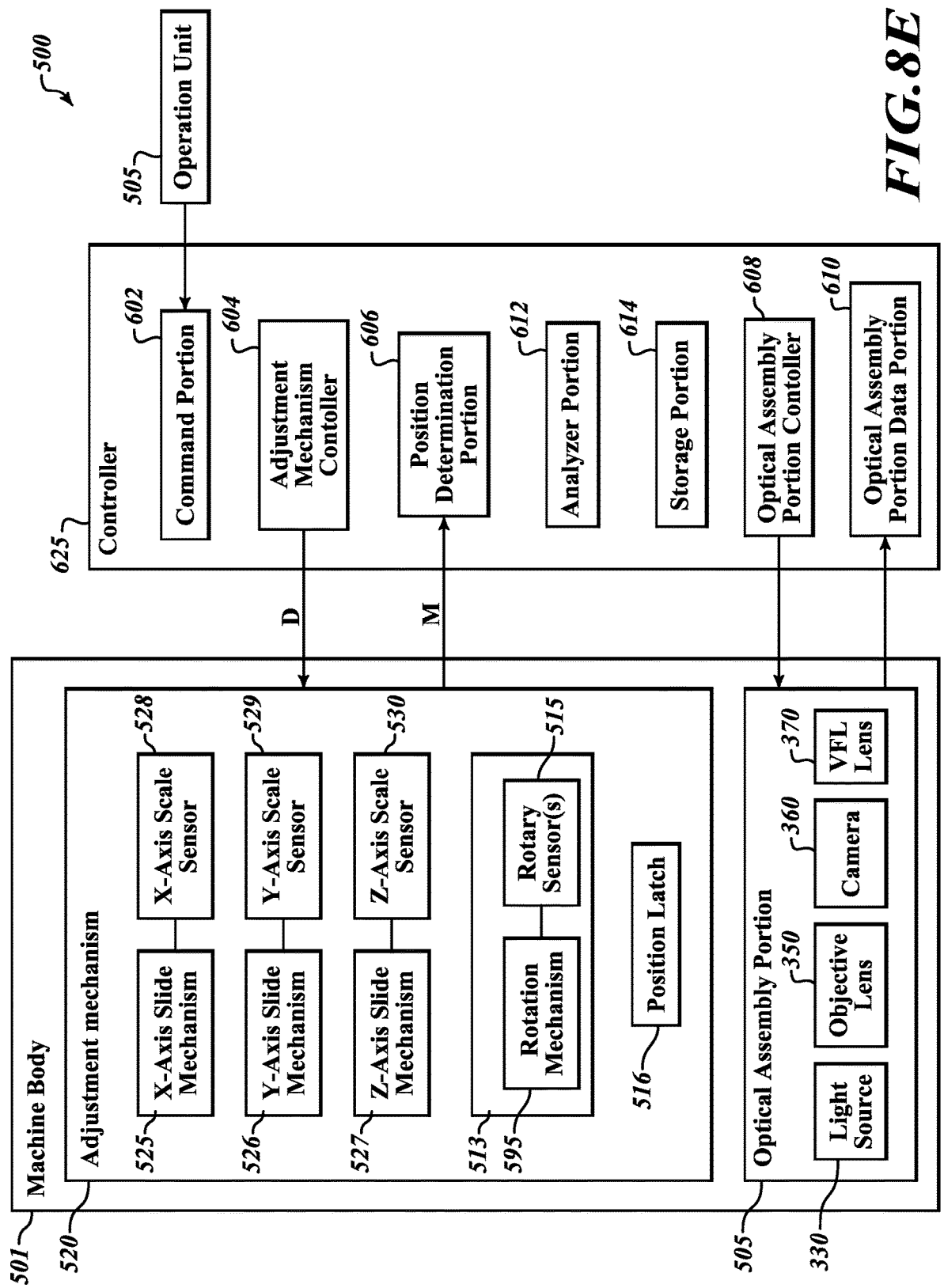
FIG. 8E is a block diagram showing various control elements of a CMM such as that of FIG. 8A.

As shown in FIG. 8E, the X-axis slide mechanism 525, the Y-axis slide mechanism 526, and the Z-axis slide mechanism 527 are provided with an X-axis scale sensor 528, a Y-axis scale sensor 529, and a Z-axis scale sensor 530, respectively. Thus, a moving amount of the optical assembly portion 505 in the X-axis, Y-axis and Z-axis directions in the machine coordinate system (MCS) can be obtained from outputs of the X-axis scale sensor 528, the Y-axis scale sensor 529, and the Z-axis scale sensor 530. In the illustrated implementation, the moving directions of the X-axis slide mechanism 525, the Y-axis slide mechanism 526, and the Z-axis slide mechanism 527 coincide with the $X_M$ direction, the $Y_M$ direction, and the $Z_M$ direction in the machine coordinate system (MCS), respectively. In various implementations, these relatively straightforward correlations and the associated components may help ensure high levels of accuracy and relatively simplified processing of the movements and position control/sensing in the $X_M$, $Y_M$ and $Z_M$ directions. The probe head 513 with the rotation mechanism 595 includes one or more rotary sensors 515 (see FIG. 8E) for sensing an angular rotation/position/orientation of the optical assembly portion 505, as will be described in more detail below.

In various implementations, as illustrated in FIGS. 8A and 8E, the adjustment mechanism 520 including the X-axis, Y-axis and Z-axis slide mechanisms 525, 526 and 527 and the rotation mechanism 595 may be controlled to move and align the optical axis OA of the optical assembly portion 505 to be nominally normal to an arbitrary workpiece surface. As with the embodiments of FIGS. 2A-3B and 7 described above, as illustrated in FIGS. 8C, 8D and 8E, the optical assembly portion 505 may include a light source 330 and an optical components portion 306 (e.g., as may include an objective lens 350, a camera 360, and a VFL (e.g., TAG) lens 370).

As shown in FIGS. 8A and 8E, the operation unit 503 is connected to a command portion 602 of the controller 625. The controller 625 includes or is coupled to a motion controller 540 configured to control the movement of the optical assembly portion 505. Various commands can be inputted to the machine body 501 and the controller 625 via the operation unit 503. As shown in FIG. 8A, the controller 625 may be embodied in a processing unit of a computer system.

As with the embodiments of FIGS. 2A-3B and 7 described above, the controller 625 of the CMM 500 may implement a method of the present disclosure including: positioning the optical assembly portion 505 relative to a workpiece surface (WPS1) so that the workpiece surface is within an autofocus range; capturing an image stack of the workpiece surface at multiple focal lengths within the autofocus range (e.g., by controlling the TAG lens 370 and/or moving the optical assembly portion 505); determining an autofocus height for at least three locations of the workpiece surface based on at least three corresponding ROIs of the image stack (e.g., for which a surface normal and adjustment information may be determined based on the determined autofocus heights); and controlling the adjustment mechanism 520 based at least in part on the determined autofocus heights for the at least three locations to: rotate the optical assembly portion 505 relative to the workpiece surface WPS1 to nominally align the optical axis OA of the optical assembly portion 505 with a surface normal SN of the workpiece surface WPS1; and adjust a distance between the optical assembly portion and the workpiece surface; and executing a defined operation on the workpiece surface WPS1.

As shown in FIG. 8E, the controller 625 includes the command portion 602, an adjustment mechanism controller 604, a position determination portion 606, an optical assembly portion controller 608, an optical assembly portion data portion 610, an analyzer portion 612, and a storage portion 614. The command portion 602 shown in FIG. 8E gives commands to the adjustment mechanism controller 604. The command portion 602 generates, as a positional command to the adjustment mechanism 520, a coordinate value in the machine coordinate system for each control cycle in consideration of, for example, moving directions, moving distances, moving speeds, and the like to move the optical assembly portion 505 to a plurality of positions and orientations. The adjustment mechanism controller 604 shown in FIG. 8E performs drive control by outputting a drive control signal D in response to a command from the command portion 602, thereby passing an electric current through motors of the X-axis, Y-axis, and Z-axis slide mechanisms 525, 526, and 527 and the rotation mechanism 595 in the adjustment mechanism 520.

A position latch 516 in one implementation communicates with the various sensors and/or drive mechanisms in order to ensure that the coordinates of the CMM 500 and the optical assembly portion 505 at the time that an image is acquired are properly synchronized. More specifically, in various implementations the position latch 516 may be utilized to help ensure the accuracy of the measurements derived and/or other determinations from the images in an image stack. In various implementations, the operations of the position latch 516 enable the CMM machine coordinates (which reflect the position of the connection point or other reference point of the optical assembly portion 505 during a particular measurement) to be properly combined with the position data determined from the optical assembly portion images (e.g., which are relative to the position and orientation of the optical assembly portion 505 itself). In certain implementations, the position latch 516 may be utilized to trigger measurements from CMM position sensors (e.g., sensors 515 and 528-530, etc.), which may include scales, encoders or other sensing elements that track an overall position and orientation of the optical assembly portion 505

(e.g. including its base position) in the machine coordinate system. In some implementations, the position latch 516 may also trigger an image acquisition from the optical assembly portion 505 (e.g., as part of an image stack, for which a trigger signal may be provided for each image in an image stack, with the corresponding position of the optical assembly portion 505 and/or phase timing of the VFL lens 370 also correspondingly being synchronized and/or tracked for each image acquisition).

When utilized with the optical assembly portion 505, the CMM adjustment mechanism 520, in particular the sensors thereof (515 and 528-530), may provide measurement outputs M to the position determination portion 606, which determines the position of the probe head 513 (or other connection point or reference position) of the optical assembly portion 505 within the CMM's machine coordinate system (MCS). For example, the position determination portion 606 may provide the X, Y and Z coordinates within the machine coordinate system (i.e., $X_M$, $Y_M$ and $Z_M$ coordinates) for the probe head 513 or other connection point or reference point of the optical assembly portion 505.

When the optical assembly portion 505 is utilized as described herein with respect to various exemplary embodiments (e.g., with respect to certain defined operations or otherwise), the position determination portion 606 may determine the position of the probe head 513 at the top of the optical assembly portion 505 (or other reference or attachment position). In order to determine coordinates of surface points on a workpiece, the information from an analysis of an image stack may be used. For example, the image stack (of images at different focus positions) may be acquired by the optical assembly portion 505, wherein the relative locations/focus positions of the images in the image stack are in terms of the optical assembly portion local coordinate system (LCS), which in some implementations may be in relation to the reference position of the optical assembly portion within the MCS. In order to determine the overall position of the surface points within the machine coordinate system (MCS), the LCS position data of the surface points may in some implementations be converted and/or otherwise combined with the MCS position data, to thereby determine the total overall positions of the surface points.

When the optical assembly portion 505 is oriented at an angle (e.g., as illustrated in FIG. 8D) and thus the optical assembly portion local coordinate system (LCS) has a Z-axis (i.e., a $Z_L$-axis) that is oriented at an angle (i.e., corresponding to the optical axis OA of the optical assembly portion 505), an acquired image stack indicates the relative distances (e.g., autofocus heights or $Z_L$ heights) of the surface points of the workpiece along the direction of the optical assembly portion Z-axis which is oriented at the angle. Those LCS coordinates may in some implementations be combined with (e.g., converted, added to, etc.) the MCS coordinates determined for the probe head 513 (or other reference position) in order to determine the overall positions of the surface points on the workpiece within the MCS. For example, if it is desired to determine the coordinates of the surface points in terms of the MCS, the determined measurement points in the optical assembly portion local coordinate system LCS may be converted to MCS coordinates and added to or otherwise combined with the other MCS coordinates of the probe head 513 (or other reference position) of the optical assembly portion 505. Alternatively, if the workpiece itself is assigned its own local coordinate system, the MCS coordinates determined for the probe head 513 (or other reference position) of the optical assembly portion 505 and/or the LCS coordinates may be converted or combined with the local coordinate system of the workpiece. As yet another example, in some instances other local coordinate systems may also or alternatively be established (e.g., for the images of the image stack, etc.) In general, the MCS covers the overall large volume of coordinates of the CMM 500, while a local coordinate system generally covers a smaller volume and in some instances may generally be contained within the MCS. In various implementations, as part of the MCS and/or a local coordinate system, in addition to X, Y and Z coordinates, certain types of cylindrical coordinates, Cartesian coordinates, or other coordinates may also or alternatively be utilized with respect to the orientation of the optical assembly portion 505 and the determination of the coordinates of measured surface points on the workpiece WP. It will be appreciated that such principles for determining coordinates are also applicable and may be utilized in the other systems described herein (e.g., with respect to FIGS. 2A-3B, 5A-5C, 7, etc.)

In some implementations, the position data in terms of the LCS from an image stack may be utilized relatively independently (e.g., with limited or no conversion or combination with the coordinates from the MCS or other coordinate systems). For example, the position data determined from the analysis of an image stack may provide 3D coordinates indicating 3D positions of surface points on a workpiece surface in terms of the LCS, which thus represent/correspond to a 3D profile/surface topography of the workpiece surface. As noted above, in some implementations such data may be combined with other position data represented in the MCS to indicate the overall position of the workpiece surface and surface points within the MCS. However, for certain implementations, analysis, and/or representations, etc., it may be desirable to primarily or only utilize the position data determined from the image stack. For example, if an analysis or inspection is primarily directed to determining the relative locations and/or characteristics of workpiece features on a workpiece surface (e.g., where a relative surface/plane is being determined/calculated along with a surface normal and/or otherwise in relation to the distances between workpiece features on the workpiece surface and/or the 3D dimensions of the workpiece features on the surface, etc.), in some implementations such data may primarily be determined from the analysis of the image stack. More specifically, if the overall position(s) within the MCS of the workpiece surface and/or workpiece features is/are not required for the desired analysis/inspection, the data determined from the image stack may be utilized with limited or no combination with other MCS or other coordinate system coordinates. In addition to analysis of such data, it will be appreciated that for some operations, a 3D representation of the workpiece surface may similarly be determined and/or provided (e.g., on a display, etc.) in accordance with the data from the analysis of an image stack (e.g., as part of a PFF process, etc.).

As illustrated in FIG. 8E, the optical assembly portion controller 608 controls the optical assembly portion 505 (e.g., controlling the lighting configuration 330, the camera 360, the VFL lens 370, etc. for obtaining images of an image stack, etc.). In various implementations, certain portions of the movement or focusing of the optical assembly portion 505 may be controlled by the CMM adjustment mechanism 520, which moves the optical assembly portion 505 closer and/or further from the workpiece, wherein the rotation mechanism 595 may be utilized for rotating the optical assembly portion 505 to be at a desired angle/orientation (e.g., nominally normal to a workpiece surface). In various implementations, a focus distance of the optical assembly portion 505 may be determined at least in part by the objective lens 350 (e.g., in combination with the VFL lens 370 for which the focus distance in front of the optical assembly portion 505 may vary during measurement operations in accordance with the operations of the VFL lens 370). The optical assembly portion data portion 610 receives the output of the optical assembly portion 505 (i.e., the image data for the images of the image stack). The analyzer portion 612 may be utilized to perform the associated analysis (e.g., the points-from-focus (PFF) analysis or other analysis of the image stack for determining the relative autofocus heights/locations of each of the surface points on the workpiece surface along the optical assembly portion Z-axis direction (i.e., the $Z_L$ direction), so as to determine a corresponding plane of the workpiece surface, and/or a 3-dimensional surface profile of the workpiece surface, etc.) The storage portion 614 may comprise a portion of a computer memory for storing certain software, routines, data, etc., for the operation of the system, etc.

FIG. 8B is a diagram schematically illustrating certain components of the machine body 501 of the CMM 500 and the optical assembly portion 505. As shown in FIG. 8B, the machine body 501 includes the probe head 513. The probe head 513 receives and transmits signals through the probe head cable 511. The probe head 513 is secured to a coordinate measuring machine quill 517, which is attached to the end of the Z-axis movement member 524 (or a sliding element, such as a spindle) which moves in the Z-axis direction of the MCS (i.e., the $Z_M$ direction). The probe head 513 is connected to the optical assembly portion 505 at a probe autojoint connection 531. One implementation of a probe autojoint connection is described in more detail in U.S. Pat. No. 9,115,982, which is hereby incorporated herein by reference in its entirety.

The probe head 513 in the illustrated embodiment includes the rotation mechanism 595 which in some implementations rotates in 360 degrees in a horizontal plane (e.g., for which angular movement/position/orientation may be sensed by a first rotary sensor 515), and may contain a type of U-joint which, for example, enables rotation of an attached optical assembly portion around a corresponding axis that lies in a horizontal plane, for which angular movement/position/orientation may be sensed by a second rotary sensor 515. Thus, the rotation mechanism 595 of the probe head 513 in the specific example of FIG. 8B supports rotation of the optical assembly portion 505 around two different axes: first, rotating (spinning) the optical assembly portion 505 in the current orientation around the Z-axis of the MCS and, second, rotating the optical assembly portion 505 around a horizontal axis (i.e., an axis in an XY plane of the MCS). The rotation mechanism 595 which in some implementations comprises a spherical (or ball) joint allows the optical assembly portion 505 to rotate around, relative to the Z-axis movement member 524 within the column 523 and/or relative to any horizontal axis, so as to position the optical axis OA of the optical assembly portion 505 at a desired angle/orientation relative to a workpiece surface (e.g., to be nominally normal to a workpiece surface). Generally, the rotation mechanism 595 is a mechanism for changing the orientation of the optical assembly portion 505 (i.e., the attitude of the optical assembly portion 505).

The probe autojoint connection 531 is an electro-mechanical connection that fastens the probe head 513 rigidly and mechanically to the optical assembly portion 505, in a way such that it can be disconnected from one probe (e.g., including an optical assembly portion) and attached to another. In one implementation, the probe autojoint connection 531 may include first and second mating auto exchange joint elements 534 and 536, wherein the first auto exchange joint element 534 is mounted to the probe head 513, and the second mating auto exchange joint element 536 is mounted to the optical assembly portion 505. In one implementation, the probe autojoint connection 531 has mating electrical contacts or connections 535 so that when a probe is attached, the contacts automatically engage and make electrical connections.

The optical assembly portion 505 may receive at least some of its power and control signals through the autojoint connection 531, for which the power and control signals are correspondingly passed through the probe head cable 511. The signals passed to the optical assembly portion 505 through the autojoint connection 531 are passed through connections 535. As shown in FIG. 8E, the optical assembly portion 505 includes an auto exchange joint element 536 and a probe assembly 537 that is mounted to the auto exchange joint element 536, for automatic connection to the CMM 500 through the probe autojoint connection 531.

In various implementations, the optical assembly portion 505 may also, or alternatively, have at least some of its power and control signals passed through a cable 511'. In some implementations, the cable 511' may be utilized due to a standard autojoint connection 531 having a limited number of wired connections available, and for which more connections may be desirable/utilized for the optical assembly portion 505 (e.g., as may be provided through the optional cable 511'). In various implementations, the power and/or communication signals for the optical assembly portion 505 (e.g., as passed through the cable 511 and/or the cable 511') may be to and from the optical assembly portion controller 608 and the optical assembly portion data portion 610 (see FIG. 8E). The optical assembly portion data portion 610 receives the output of the optical assembly portion 505 (i.e., the image data for the images of the image stack). The analyzer portion 612 may be utilized to perform the associated analysis of the image stack, such as autofocus processing to calculate/determine an autofocus height for at least three locations of the workpiece surface, (e.g., as may be utilized to calculate/determine a surface normal of the workpiece surface), etc. The storage portion 614 may comprise a portion of a computer memory for storing certain software, routines, data, etc., for the operation of the controller 625, etc.

While the rotation mechanism 595 is illustrated to comprise a type of U-joint in FIGS. 8A and 8B, the configuration of the rotation mechanism 595 is not so limited. For example, a rotation mechanism 595 may be provided in the form of a rotary stage included in or on the surface plate 510 of the CMM 500 to support a workpiece WP (see FIG. 8A), or in the form of a rotary stage provided at the distal end of the Z-axis movement member 524 of the CMM 500 (e.g., similar to the rotary stage 297 of FIGS. 1-3B).

FIGS. 8C and 8D illustrate certain components relative to FIGS. 8A and 8B, including certain parts of the adjustment mechanism 520 including a rotation mechanism 595' (embodied in a probe head 513') of the machine body 501 of the CMM 500. FIG. 8C illustrates the optical assembly portion 505 in a vertical orientation (e.g., similar to how certain prior art systems, such as certain vision systems, have primarily been operated to only move a focusing position up and down along a $Z_M$-axis direction of a machine coordinate system in order to obtain an image stack including images of a workpiece). As shown in FIG. 8C, the workpiece WP has a workpiece surface WPS1 that has an angular orientation (at an angle A1). It is noted that the machine coordinate system's Z-axis is parallel to the optical axis OA of the optical assembly portion 505 in the illustration of FIG. 8C. It will be appreciated that the optical axis ($Z_L$-axis) of the optical assembly portion 505 may be in a same direction as the machine coordinate system's $Z_M$-axis and an image stack acquisition axis ISAA if the optical assembly portion 505 is simply moved up and down along the $Z_M$-axis of the MCS by the Z-axis slide mechanism 527 (including movement of the Z-axis movement member 524 within the column 523). The workpiece surface WPS1 is shown to be at angle A1 relative to a horizontal plane of the MCS. In contrast, a workpiece surface WPS2 of the workpiece WP is shown to be approximately parallel to a horizontal plane in the MCS. A surface normal SN of the workpiece surface WPS1 is shown to be at an angle A2 relative to the optical axis OA (e.g., for which the optical assembly portion 505 may be rotated by the amount indicated by the angle A2, as illustrated in FIG. 8D).

FIG. 8D illustrates the optical assembly portion 505 as having been rotated (e.g., by the amount of angle A2) to be at an angle relative to both a horizontal plane of the MCS (at angle "A-H") and a vertical plane of the MCS (at angle "A-V"), in accordance with various embodiments of the present disclosure, as can be achieved with the CMM 500 as disclosed. The optical assembly portion 505 has been rotated (e.g., by a U joint or other component of the rotation mechanism 595' of the probe head 513') around a horizontal rotation axis RA2 passing through the rotation point R2 so as to be pointed at the angle A-H, and for which the optical axis OA of the optical assembly portion 505 is nominally normal (i.e., approximately perpendicular) to the workpiece surface WPS1. In FIG. 8D, the ability of the rotation mechanism 595' of the probe head 513' to rotate the optical assembly portion 505 around the Z-axis of the MCS is illustrated by a rotation axis RA1 passing through a rotation point R1 at the top of the probe head 513'/rotation mechanism 595'. The rotation around a horizontal axis is illustrated in accordance with the rotation axis RA2 (i.e., indicated as a single point since it is directed into the page) as passing through the rotation point R2 at the center of the probe head 513'/rotation mechanism 595' (e.g., in accordance with the operation of the U joint as illustrated in FIG. 8B).

In FIG. 8D, an example image stack range SR-3B is illustrated which in various implementations may be part of all of an autofocus range, or a PFF range (e.g., for determining a 3-dimensional surface profile of the workpiece surface WPS1), etc. The workpiece surface WPS1 may have various workpiece features (e.g., surface features) that may be higher or lower than an average plane location of the workpiece surface WPS1. In some implementations, it may be desirable to have the range of respective focus positions of the image stack extend for a certain distance above and below the workpiece surface. As illustrated in FIG. 8D, the example image stack range SR-3B may be significantly smaller than an image stack range SR-3A of FIG. 8C (e.g., the image stack range required to cover all of the surface points of the workpiece surface WPS1 in the illustrated orientation of FIG. 8C), due to the fact that the optical assembly portion 505 in FIG. 8D is oriented such that its optical axis OA is nominally normal (i.e., approximately perpendicular) to the workpiece surface WPS1, as contrasted with the relative angular orientation in FIG. 8C. In FIG. 8D, an angle of the optical axis OA (and the image stack acquisition axis ISAA) relative to at least a portion of the workpiece surface WPS1 is indicated as "A-P," which is nominally normal (e.g., approximately 90 degrees/perpendicular) in the illustrated example. FIG. 8D also illustrates an angle of the workpiece surface WPS1 relative to a horizontal plane, "A-W" (e.g., as corresponding to angle A1 of FIG. 8C). Depending on a particular angle A-W in each implementation, the rotation mechanism 595' may be adjusted to ensure the optical axis OA (and ISAA) of the optical assembly portion 505 is nominally normal (i.e., approximately perpendicular) to at least a portion of the workpiece surface WPS1.

In order to achieve the orientation of FIG. 8D, certain processes may be performed in accordance with principles as disclosed herein (e.g., similar to the examples described above with respect to FIGS. 5B and 5C). For example, the configuration of FIG. 8C may be achieved by controlling the adjustment mechanism 520 to move the optical assembly portion 505 to place the workpiece surface WPS1 within a focal Z autofocus range of the optical assembly portion 505. In the illustration of FIG. 8C, this may correspond to positioning the optical assembly portion 505 at a distance D-8C from a location on the workpiece surface WPS1 (e.g., a location where the optical axis OA intersects the workpiece surface WPS1, which in some instances may be at or near a mid-point or other central location of the workpiece surface WPS1). In the example of FIG. 8C, the focal Z autofocus range is represented by a range SR-3A. As described above with respect to FIGS. 6A and 6B, as part of the autofocus process, an image stack may be captured of the workpiece surface WPS1 within the focal Z autofocus range using the optical assembly portion 505. An autofocus height may be determined for each of at least three locations on the workpiece surface WPS1 based on at least three corresponding regions of interest of the image stack, as described above with respect to FIGS. 6A and 6B.

As illustrated in FIG. 8D, the adjustment mechanism 520 may be controlled based at least in part on the autofocus heights at the at least three surface locations to: rotate the optical assembly portion 505 relative to the workpiece surface WPS1 to nominally align the optical axis OA of the optical assembly portion 505 with a surface normal SN of the workpiece surface WPS1; and to adjust a distance between the optical assembly portion 505 and the workpiece surface WPS1. In various implementations, prior to the controlling of the adjustment mechanism as illustrated in FIG. 8D, the determined autofocus heights for the at least three surface locations may be used for calculating or otherwise determining the surface normal SN of the workpiece surface WPS1 and/or corresponding adjustment information. The adjustment mechanism 520 may then be controlled (e.g., utilizing the adjustment information and/or surface normal that was calculated/determined based on the autofocus heights) to rotate and otherwise move the optical assembly portion 505 from the position and orientation illustrated in FIG. 8C to be in the position and orientation illustrated in FIG. 8D, for which the optical axis OA is shown to nominally coincide with the surface normal SN. In addition, the adjustment mechanism 520 may be used to adjust the distance between the optical assembly portion 505 and the workpiece surface WPS1. As illustrated in FIG. 8D, the adjustment has resulted in a distance D-8D between the optical assembly portion 505 and the workpiece surface WPS1 (e.g., as measured along the direction of the optical axis OA and/or the corresponding $Z_L$ direction). As described above with respect to FIGS. 3A and 3B, in various implementations the distance D-8D may correspond to the workpiece surface WPS1 nominally being at or near: a middle of the range SR-3B (e.g., a range for a PFF or other defined operation to be executed on the workspace surface); and/or a working distance of an objective lens of the optical assembly portion 505; and/or a best focus position, etc. Once in the orientation and position illustrated in FIG. 8D, a defined operation may be executed on the workpiece surface WPS1.

As an example of a defined operation, a measurement operation, utilizing the optical assembly portion 505, may be performed on the workpiece surface WPS1. As part of such operations or otherwise, a PFF operation may be performed (e.g., for determining a surface profile of the workpiece surface WPS1). As part of a PFF operation, an image stack may be captured with the optical assembly portion 505 in the orientation illustrated in FIG. 8D (e.g., and with the image stack corresponding to the scan range SR-3B). As another type of defined operation that may be executed on the workpiece surface WPS1, a machining operation (e.g., drilling) may be performed, for which it may be desirable for a machining axis (e.g., a drilling axis) of the machining operation to coincide with (e.g., be coaxial with or parallel to, etc.) the optical axis OA of the optical assembly portion 505, and thus also be nominally normal to the workpiece surface SRF1.

Figure 9:
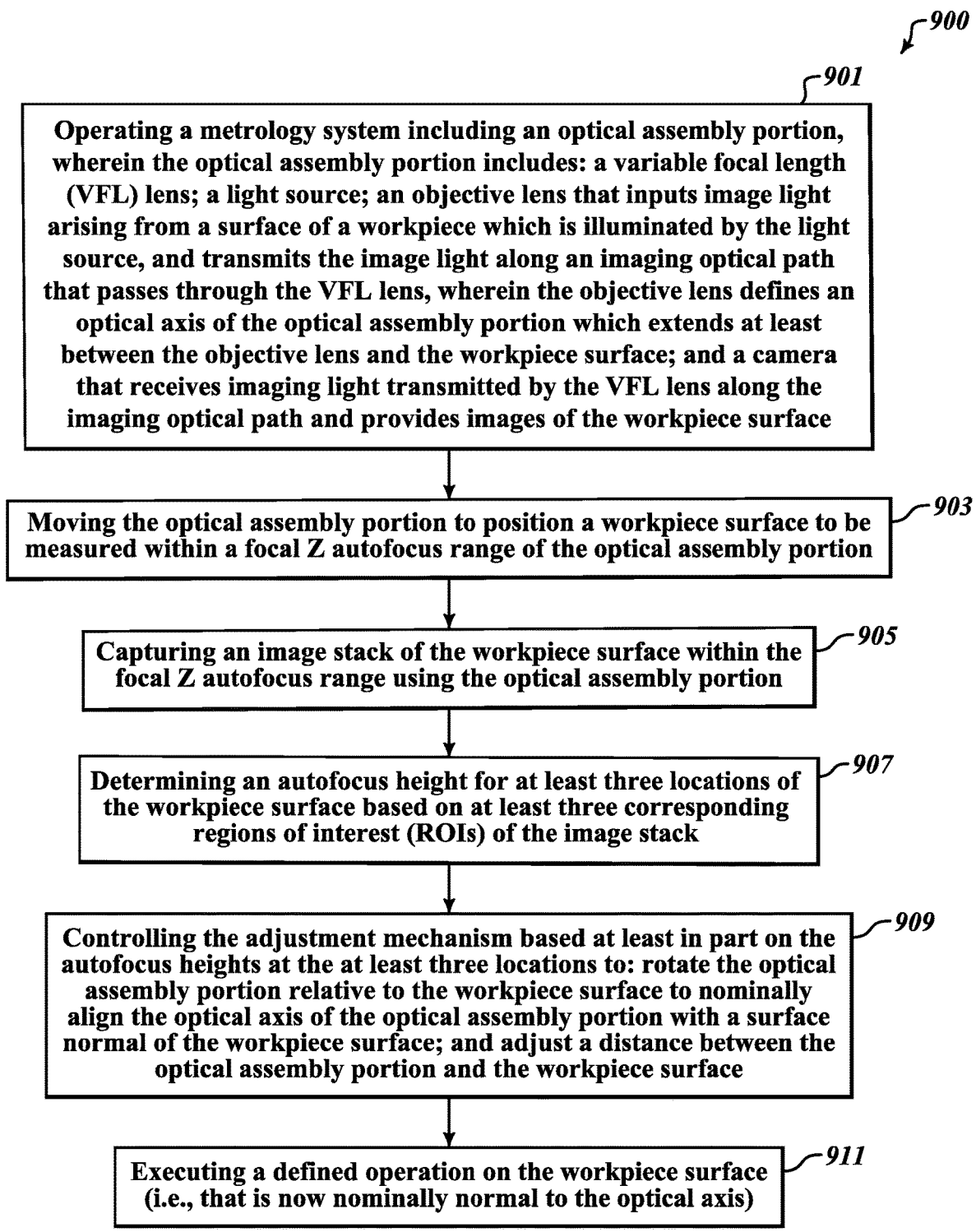
FIG. 9 is a flowchart of a method of using multi-point autofocus to align an optical axis to be nominally normal to a workpiece surface according to one aspect of the present disclosure.

FIG. 9 is a flowchart of a method 900 of using multi-point autofocus to align an optical axis normal to a surface according to one aspect of the present disclosure. In block 901, the method operates a metrology system including an optical assembly portion (205, 305, 405, 505). The optical assembly portion includes: a variable focal length (VFL) lens; a light source; and an objective lens that inputs image light arising from a surface of a workpiece which is illuminated by the light source, and transmits the image light along an imaging optical path that passes through the VFL lens. The objective lens defines an optical axis of the optical assembly portion which extends at least between the objective lens and the workpiece surface. The optical assembly portion also includes a camera that receives imaging light transmitted by the VFL lens along the imaging optical path and provides images of the workpiece surface.

In block 903, the method moves the optical assembly portion to position a workpiece surface to be measured within a focal Z autofocus range of the optical assembly portion.

In block 905, the method captures an image stack of the workpiece surface within the focal Z autofocus range using the optical assembly portion.

In block 907, the method calculates an autofocus height for at least three locations of the workpiece surface based on at least three corresponding regions of interest (ROIs) of the image stack. In various implementations, a surface normal of the workpiece surface and corresponding adjustment information may be determined based at least in part on the autofocus heights at the three locations.

In block 909, the method controls the adjustment mechanism based at least in part on the autofocus heights at the at least three locations to: rotate the optical assembly portion relative to the workpiece surface to nominally align the optical assembly portion with a surface normal of the workpiece surface; and adjust a distance between the optical assembly portion and the workpiece surface.

In block 911, the method executes a defined operation on the workpiece surface that is now nominally normal to the optical axis.

Various defined operations are executable, wherein these operations can all take advantage of the fact that the metrology system according to various embodiments can rapidly and/or precisely align an optical axis of an optical assembly portion nominally normal to a workpiece surface to be operated on.

For example, after the defined operation of block 911 is executed, the process of blocks 903 to 911 may be repeated for another portion of the workpiece surface and/or for another workpiece surface of the workpiece (e.g., for a workpiece including a turbine blade, the process may be repeated for different sections as following along a curve of the turbine blade, etc.).

As another example, non-optical operations, such as a machining (e.g., drilling) operation may be performed on the workpiece surface, where the machining operation axis coincides with the optical axis of the optical assembly portion oriented nominally normal to the workpiece surface.

As other examples, various optical operations, such as extended depth of field (EDOF) operations or points-from-focus (PFF) operations may be performed. Some details of the EDOF operations and the PFF operations can be found, for example, in U.S. Patent Publication No. 2020/0195836, which is hereby incorporated herein by reference in its entirety. Briefly, in the EDOF operation, the optical assembly portion (205, 305, 405, 505) including the VFL (TAG) lens may be operated to expose a preliminary image using an EDOF exposure sequence, which defines a plurality of discrete image exposure increments acquired at respective discrete focus positions FP corresponding to respective phases of the periodically modulated focus position. The preliminary image is processed to determine or output an EDOF image that has a larger depth of field than the VFL (TAG) lens imaging system in a single focal position (e.g., 10-20 times larger, or more, in various embodiments), wherein the EDOF image is substantially focused throughout the larger depth of field. In various embodiments, the EDOF image may be provided at a high rate, suitable for display approximately in real time. For example, the EDOF image exposure sequence may be configured to acquire the preliminary image in less than 500 msec, or less than 250 msec, or less than 100 msec, or less than 50 msec.

Briefly, in the PFF operation, the optical assembly portion (205, 305, 405, 505) including the VFL (TAG) lens may be operated to expose a stack of images (an image stack) using a PFF exposure sequence, which defines a plurality of discrete image exposure increments acquired at respective discrete focus positions FP corresponding to respective phases of the periodically modulated focus position. The image stack is processed to determine or output a $Z_L$-height coordinate map (e.g. a point cloud) that quantitatively indicates a set of 3 dimensional surface coordinates corresponding to a surface shape of the workpiece.

In various implementations, when a defined operation that is being performed on the workpiece surface involves a movement along the direction of the optical axis OA, it will be appreciated that inclusion of a VFL lens (e.g., VFL lens 220, 370, etc.) may have various advantages. For example, as described above, when a VFL lens (e.g., a TAG lens) is included, in some implementations a modulation of a focus position of the VFL lens may be achieved without requiring physical movement of components along the direction of the optical axis OA (e.g., as may allow such operations to be more quickly and repeatably performed and without risk of collisions, such as potential collisions of otherwise moving components with the workpiece surface, structures and/or other components, etc.). In some implementations, such aspects may be particularly advantageous when the optical assembly portion is tilted (e.g., relative to a Z axis of the machine coordinate system, such as illustrated in FIGS. 2B, 3B, 5C and 8D). In general, in implementations where a VFL lens is not included and/or movement beyond the modulation limits of the VFL lens are desired along the direction of the optical axis, various more complex movement sequences may be required.

For example, in relation to the configuration of FIG. 2B, if an image stack is to be acquired (e.g., as part of a multi-point autofocus or PFF operation) along a constant image stack acquisition axis ISAA, without use of a VFL lens, such may require various repositioning movements for each image. More specifically, in order for the optical assembly portion 205 to be properly aligned along an image stack acquisition axis ISAA relative to the workpiece surface WPS1, for each image acquisition position, an adjustment may need to be made along the Z axis of the machine coordinate system (e.g., utilizing the motor 294) as well as an adjustment along the Y and/or X axis of the machine coordinate system (e.g., as provided by the moveable stage 210 moving the workpiece). Alternatively, in some implementations, even in an orientation such as that illustrated in FIG. 2B, it may be acceptable for the image acquisition positions/movements to be provided only along the Z axis of the machine coordinate system (e.g., as provided by the motor 294). In the orientation illustrated in FIG. 2B, such motion only along the Z axis direction of the machine coordinate system will not maintain the optical axis OA of the optical assembly portion 205 along a constant image stack acquisition axis ISAA for the acquisition of each of the images in the image stack, but for which the stack of images that is captured may have a sufficiently large field of view, such that one or more desired regions of interest may still be included in all of the images of the image stack, only with shifted relative positions in each image. Through appropriate processing, the desired regions of interest may be determined/tracked and utilized for desired operations (e.g., multi-point autofocus operations as may be utilized according to the methods as described herein, PFF operations, etc.). It will be appreciated that the inclusion and utilization of a VFL lens (e.g., VFL lens 270) may avoid the need for such processing and additional movements (i.e., in that the modulation of the VFL lens may enable an image stack to be captured along a constant image stack acquisition axis ISAA in a relatively fast and repeatable manner, without requiring physical movement of other components and related processing).

As another example, in the implementation of FIG. 8D, without the utilization/inclusion of the VFL lens 370, in order to capture an image stack along the image stack acquisition axis ISAA, for each image acquisition position, movements may be required along the X, Y, and/or Z axis directions of the machine coordinate system (e.g., as provided by the X, Y, and Z axis slide mechanisms 525, 526, and 527). As noted above, such movements may not be required when the VFL lens 370 is included and utilized (i.e., in that the modulation of the VFL lens 370 may enable the images of the image stack to be acquired as corresponding to different focus positions along the constant image stack acquisition axis ISAA without requiring physical movement of other components).

As described above, in various implementations an adjustment mechanism is controlled to move an optical assembly portion to position a workpiece surface within a focal Z autofocus range of the optical assembly portion. In implementations where a VFL lens is included and is utilized for the autofocus scanning (e.g., without motion of other components for the autofocus scanning), the focal Z autofocus range may primarily be determined by/related to a range (e.g., range Refp) of operation of the VFL lens. For example, for certain TAG lenses, in some implementations this may correspond to a range of approximately 10 DOF (depth of field) of the optical system (e.g., for which the positioning may therefore be made to be within 10 DOF of the optical system). As noted above, in various implementations without utilization/inclusion of a VFL lens (and/or where motion is provided by the system for increasing the scan range beyond/in addition to that provided by the operation of the VFL lens), the focal Z autofocus range may be determined by/correspond to other aspects of the system (e.g., in relation to ranges of motion of various components, such as a range of movement by the motor 294, and/or for avoiding collisions, etc.)

As noted above, in various implementations a multi-point autofocus image stack may be acquired relatively quickly and may include a relatively small number of images (e.g., 5-10 images). In various implementations, it is desirable to move the optical assembly portion to position the workpiece surface within the focal Z autofocus range of the optical assembly portion, such that the multi-point autofocus image stack includes images on both sides of focal Z positions of various portions of the workpiece surface. In some implementations, this may correspond to having at least a certain number of DOF (e.g., 1 or 2 DOF) on either side of the focal Z position of each portion of the workpiece surface in the field of view of the optical assembly portion. Such aspects may be advantageous in regard to determining a peak of corresponding focus curve data, as described above. More specifically, as noted above, determining of an autofocus height for a location of the workpiece surface may include determining focus curve data for the location/corresponding region of interest based at least in part on an analysis of the images of the image stack, wherein the focus curve data for the location/region of interest indicates the corresponding autofocus height, such as may correspond to a peak of the focus curve data. By acquiring images corresponding to sufficient focus curve data on either side of the peak, the peak may be determined with greater/sufficient/desirable precision and/or accuracy, etc.

It will be appreciated that such principles and description may also apply with respect to other processes described herein. For example, as noted above in various implementations after a surface normal is determined/calculated the motion controller may be utilized to rotate/adjust an orientation of the optical assembly portion and to adjust a distance between the optical assembly portion and the workpiece surface. In various implementations, the distance from the workpiece surface that the optical assembly portion is adjusted to may be based at least in part on principles such as those described above. For example, it may be desirable for the distance to be such that the workpiece surface is positioned at a desired location within the scan range of the system (e.g., as corresponding to a desired location within a PFF image stack scan range, so that there are a desired number of images corresponding to focus data on either side of each portion of the workpiece surface, and/or according to certain desirable performance characteristics of that portion of the scan range, etc.)

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations.

What is claimed is:

1. A metrology system, comprising:
an optical assembly portion comprising:
a light source;
an objective lens that inputs image light arising from a surface of a workpiece which is illuminated by the light source, and transmits the image light along an imaging optical path, wherein the objective lens defines an optical axis of the optical assembly portion which extends at least between the objective lens and the workpiece surface; and
a camera that receives imaging light transmitted along the imaging optical path and provides images of the workpiece surface;
an adjustment mechanism configured to change a distance between the optical assembly portion and the workpiece surface and to rotate the optical assembly portion relative to the workpiece surface to change an angular orientation of the optical axis of the optical assembly portion relative to the workpiece surface;
one or more processors; and
a memory coupled to the one or more processors and storing program instructions that when executed by the one or more processors cause the one or more processors to at least:
control the adjustment mechanism to move the optical assembly portion to position a first workpiece surface of a workpiece within a focal Z autofocus range of the optical assembly portion;
capture a first image stack of the first workpiece surface within the focal Z autofocus range using the optical assembly portion, wherein the first image stack comprises a plurality of images of the first workpiece surface and each image of the first image stack corresponds to a different autofocus height;
determine an autofocus height for at least three locations of the first workpiece surface based on at least three corresponding regions of interest of the first image stack;
control the adjustment mechanism based at least in part on the autofocus heights at the at least three locations to:
rotate the optical assembly portion relative to the first workpiece surface to nominally align the optical axis of the optical assembly portion with a surface normal of the first workpiece surface; and
adjust a distance between the optical assembly portion and the first workpiece surface;
execute a first operation on the first workpiece surface, wherein the first operation comprises at least one of a measurement operation, a points-from-focus (PFF) operation, a machining operation, or capturing one or more images of the first workpiece surface;
control the adjustment mechanism to move the optical assembly portion to position a second workpiece surface of the workpiece within a focal Z autofocus range of the optical assembly portion;
capture a second image stack of the second workpiece surface using the optical assembly portion, wherein the second image stack comprises a plurality of images of the second workpiece surface and each image of the second image stack corresponds to a different autofocus height;
determine an autofocus height for at least three locations of the second workpiece surface based on at least three corresponding regions of interest of the second image stack;
control the adjustment mechanism based at least in part on the autofocus heights at the at least three locations to:
rotate the optical assembly portion relative to the second workpiece surface to nominally align the optical axis of the optical assembly portion with a surface normal of the second workpiece surface; and
adjust a distance between the optical assembly portion and the second workpiece surface; and
execute a second operation on the second workpiece surface, wherein the second operation comprises at least one of a measurement operation, a points-from-focus (PFF) operation, a machining operation, or capturing one or more images of the second workpiece surface.

2. The metrology system of claim 1, wherein the optical assembly portion further comprises a variable focal length (VFL) lens that is included in the imaging optical path, and wherein the objective lens transmits the image light along the imaging optical path through the VFL lens and the camera receives the imaging light transmitted by the VFL lens along the imaging optical path.

3. The metrology system of claim 2, wherein the VFL lens is a tunable acoustic gradient (TAG) lens configured to non-mechanically vary a focal length, and for which a periodically modulated focus position of the optical assembly portion is controlled by periodically modulating the optical power of the TAG lens and is utilized for capturing the images of the first and second image stacks.

4. The metrology system of claim 2, wherein the first operation that is executed on the first workpiece surface comprises utilizing the VFL lens for capturing one or more images of the first workpiece surface.

5. The metrology system of claim 2, wherein the first operation that is executed on the first workpiece surface comprises utilizing the VFL lens for capturing an image stack while the optical axis of the optical assembly portion is nominally aligned with a surface normal of the first workpiece surface, for which the image stack comprises a plurality of images of the first workpiece surface and each image of the image stack corresponds to a different focus position of the optical assembly portion along the direction of the optical axis.

6. The metrology system of claim 1, wherein the determining of the autofocus heights for the at least three locations of the first workpiece surface comprises determining focus curve data for each of the regions of interest based at least in part on an analysis of the images of the first image stack, wherein for each of the at least three locations a peak of the focus curve data for the corresponding region of interest indicates the corresponding autofocus height.

7. The metrology system of claim 1, wherein the program instructions when executed by the one or more processors further cause the one or more processors to:
determine a surface normal of the first workpiece surface based at least in part on the autofocus heights at the at least three locations; and
determine adjustment information to control the adjustment mechanism to rotate the optical assembly portion based at least in part on the determined surface normal.

8. The metrology system of claim 1, wherein the first operation comprises a measurement operation for determining a dimension of a feature of the first workpiece surface.

9. The metrology system of claim 1, wherein the first operation comprises a points-from-focus (PFF) operation including:

acquiring an image stack including a plurality of images each corresponding to a focus position of the optical assembly portion along an imaging optical axis which coincides with the optical axis, and determining focus curve data based at least in part on an analysis of the images of the image stack, wherein the focus curve data indicates 3 dimensional positions of a plurality of surface points on the first workpiece surface.

10. The metrology system of claim 1, wherein the first operation comprises a machining operation that is executed on the first workpiece surface, wherein a machining axis of the machining operation at least one of nominally coincides with or is nominally parallel to the optical axis of the optical assembly portion.

11. The metrology system of claim 1, wherein the adjustment mechanism comprises a rotation mechanism and a Z-axis movement mechanism, for which the Z-axis movement mechanism is coupled to move the optical assembly portion along a Z-axis direction and the rotation mechanism is coupled between the Z-axis movement mechanism and the optical assembly portion and is configured to rotate the optical assembly portion relative to the first workpiece surface to change an angular orientation of the optical axis of the optical assembly portion relative to the first workpiece surface.

12. The metrology system of claim 11, wherein the metrology system is embodied in a precision machine vision inspection system and the adjustment mechanism comprises a rotary stage which includes the rotation mechanism and which is coupled between the Z-axis movement mechanism and the optical assembly portion.

13. The metrology system of claim 1, wherein the metrology system is embodied in a coordinate measuring machine system and the adjustment mechanism includes:
an x-axis slide mechanism, a y-axis slide mechanism and a z-axis slide mechanism that are configured to move the optical assembly portion in mutually orthogonal x-axis, y-axis and z-axis directions, respectively, in a machine coordinate system, and
a rotation mechanism configured to rotate the optical assembly portion relative to the first workpiece surface.

14. The metrology system of claim 1, wherein the metrology system is embodied in a robot system and the adjustment mechanism comprises a robot arm having at least three degrees of freedom for moving the optical assembly portion.

15. A method for operating a metrology system including an optical assembly portion, wherein the optical assembly portion comprises:
a light source;
an objective lens that inputs image light arising from a surface of a workpiece which is illuminated by the light source, and transmits the image light along an imaging optical path, wherein the objective lens defines an optical axis of the optical assembly portion which extends at least between the objective lens and the workpiece surface; and
a camera that receives imaging light transmitted along the imaging optical path and provides images of the workpiece surface;
the method comprising:
moving the optical assembly portion to position a first workpiece surface of the workpiece within a focal Z autofocus range of the optical assembly portion;
capturing a first image stack of the first workpiece surface within the focal Z autofocus range using the optical assembly portion, wherein the first image stack comprises a plurality of images of the first workpiece surface and each image of the first image stack corresponds to a different autofocus height;
determining an autofocus height for at least three locations of the first workpiece surface based on at least three corresponding regions of interest of the first image stack;
based at least in part on the autofocus heights at the at least three locations, determining adjustment information for rotating the optical assembly portion relative to the first workpiece surface to nominally align the optical axis of the optical assembly portion with a surface normal of the first workpiece surface and for adjusting a distance between the optical assembly portion and the first workpiece surface;
utilizing the adjustment information for rotating the optical assembly portion to nominally align the optical axis of the optical assembly portion with a surface normal of the first workpiece surface and for adjusting a distance between the optical assembly portion and the first workpiece surface;
executing a first operation on the first workpiece surface, wherein the first operation comprises at least one of a measurement operation, a points-from-focus (PFF) operation, a machining operation, or capturing one or more images of the first workpiece surface;
moving the optical assembly portion to position a second workpiece surface of the workpiece within the focal Z autofocus range of the optical assembly portion;
capturing a second image stack of the second workpiece surface using the optical assembly portion, wherein the second image stack comprises a plurality of images of the second workpiece surface and each image of the second image stack corresponds to a different autofocus height;
determining an autofocus height for at least three locations of the second workpiece surface based on at least three corresponding regions of interest of the second image stack;
based at least in part on the autofocus heights at the at least three locations, determining adjustment information for rotating the optical assembly portion relative to the second workpiece surface to nominally align the optical axis of the optical assembly portion with a surface normal of the second workpiece surface and for adjusting a distance between the optical assembly portion and the second workpiece surface;
utilizing the adjustment information for rotating the optical assembly portion to nominally align the optical axis of the optical assembly portion with a surface normal of the second workpiece surface and for adjusting a distance between the optical assembly portion and the second workpiece surface; and
executing a second operation on the second workpiece surface, wherein the second operation comprises at least one of a measurement operation, a points-from-focus (PFF) operation, a machining operation, or capturing one or more images of the second workpiece surface.

16. The method of claim 15, wherein:
the optical assembly portion further comprises a tunable acoustic gradient (TAG) lens that is included in the imaging optical path, and wherein the objective lens transmits the image light along the imaging optical path through the TAG lens and the camera receives the imaging light transmitted by the TAG lens along the imaging optical path; and the method further comprises periodically modulating an optical power of the TAG lens to provide a periodically modulated focus position of the optical assembly portion which is utilized for capturing the images of the first and second image stacks.

17. The method of claim 16, wherein the first operation that is executed on the first workpiece surface comprises utilizing the TAG lens for capturing one or more images.

18. The method of claim 15, further comprising determining a surface normal of the first workpiece surface based at least in part on the autofocus heights at the at least three locations, wherein the adjustment information is determined based at least in part on the determined surface normal.

19. The method of claim 15, wherein the first operation comprises a measurement operation for determining a dimension of a feature of the first workpiece surface.

20. The method of claim 15, wherein the first operation comprises a points-from-focus (PFF) operation including:
acquiring an image stack including a plurality of images each corresponding to a focus position of the optical assembly portion along an imaging optical axis which coincides with the optical axis, and
determining focus curve data based at least in part on an analysis of the images of the image stack, wherein the focus curve data indicates 3 dimensional positions of a plurality of surface points on the first workpiece surface.

21. A metrology system, comprising:
an optical assembly portion comprising:
a variable focal length (VFL) lens;
a light source;
an objective lens that inputs image light arising from a surface of a workpiece which is illuminated by the light source, and transmits the image light along an imaging optical path that passes through the VFL lens, wherein the objective lens defines an optical axis of the optical assembly portion which extends at least between the objective lens and the workpiece surface; and
a camera that receives imaging light transmitted by the VFL lens along the imaging optical path and provides images of the workpiece surface;
a Z-axis movement mechanism configured to change a distance between the optical assembly portion and the workpiece surface;
a rotation mechanism configured to rotate the optical assembly portion relative to the workpiece surface to change an angular orientation of the optical axis of the optical assembly portion relative to the workpiece surface;
one or more processors; and
a memory coupled to the one or more processors and storing program instructions that when executed by the one or more processors cause the one or more processors to at least:
control at least one of the Z-axis movement mechanism or the rotation mechanism to move the optical assembly portion to position a first workpiece surface of a workpiece within a focal Z autofocus range of the optical assembly portion;
capture a first image stack of the first workpiece surface within the focal Z autofocus range using the optical assembly portion, wherein the first image stack comprises a plurality of images of the first workpiece surface and each image of the first image stack corresponds to a different autofocus height;
determine an autofocus height for at least three locations of the first workpiece surface based on at least three corresponding regions of interest of the first image stack;
based at least in part on the autofocus heights at the at least three locations, control the rotation mechanism to rotate the optical assembly portion relative to the first workpiece surface to nominally align the optical axis of the optical assembly portion with a surface normal of the first workpiece surface and control the Z-axis movement mechanism to adjust a distance between the optical assembly portion and the first workpiece surface;
execute a first operation on the first workpiece surface, wherein the first operation comprises at least one of a measurement operation, a points-from-focus (PFF) operation, a machining operation, or capturing one or more images of the first workpiece surface;
control at least one of the Z-axis movement mechanism or the rotation mechanism to move the optical assembly portion to position a second workpiece surface of the workpiece within the focal Z autofocus range of the optical assembly portion;
capture a second image stack of the second workpiece surface using the optical assembly portion, wherein the second image stack comprises a plurality of images of the second workpiece surface and each image of the second image stack corresponds to a different autofocus height;
determine an autofocus height for at least three locations of the second workpiece surface based on at least three corresponding regions of interest of the second image stack;
based at least in part on the autofocus heights at the at least three locations, control the rotation mechanism to rotate the optical assembly portion relative to the second workpiece surface to nominally align the optical axis of the optical assembly portion with a surface normal of the second workpiece surface and control the Z-axis movement mechanism to adjust a distance between the optical assembly portion and the second workpiece surface; and
execute a second operation on the second workpiece surface, wherein the second operation comprises at least one of a measurement operation, a points-from-focus (PFF) operation, a machining operation, or capturing one or more images of the second workpiece surface.

22. The metrology system of claim 21, wherein the VFL lens is a tunable acoustic gradient (TAG) lens for which a periodically modulated focus position of the optical assembly portion is controlled by periodically modulating the optical power of the TAG lens and which is utilized for capturing the images of the first and second image stacks.

23. The metrology system of claim 2, wherein a periodically modulated focus position of the optical assembly portion is controlled by periodically modulating an optical power of the VFL lens and the images of the first image stack are each captured at a different phase timing of the periodic modulation so as to each correspond to a different autofocus height.

24. A system, comprising:
an optical assembly portion comprising:
a light source;
an objective lens that inputs image light arising from a surface of a workpiece which is illuminated by the light source, and transmits the image light along an imaging optical path, wherein the objective lens defines an optical axis of the optical assembly portion which extends at least between the objective lens and the workpiece surface; and a camera that receives imaging light transmitted along the imaging optical path and provides images of the workpiece surface;

an adjustment mechanism configured to change a distance between the optical assembly portion and the workpiece surface and to rotate the optical assembly portion relative to the workpiece surface to change an angular orientation of the optical axis of the optical assembly portion relative to the workpiece surface;

one or more processors; and a memory coupled to the one or more processors and storing program instructions that when executed by the one or more processors cause the one or more processors to at least:

control the adjustment mechanism to move the optical assembly portion to position a workpiece surface within a focal Z autofocus range of the optical assembly portion;

capture a first image stack of the workpiece surface within the focal Z autofocus range using the optical assembly portion, wherein the first image stack comprises a plurality of images of the workpiece surface and each image of the first image stack corresponds to a different autofocus height;

determine an autofocus height for at least three locations of the workpiece surface based on at least three corresponding regions of interest of the first image stack;

control the adjustment mechanism based at least in part on the autofocus heights at the at least three locations to:

rotate the optical assembly portion relative to the workpiece surface to nominally align the optical axis of the optical assembly portion with a surface normal of the workpiece surface; and adjust a distance between the optical assembly portion and the workpiece surface; and execute an operation on the workpiece surface, wherein the operation comprises capturing a second image stack while the optical axis of the optical assembly portion is nominally aligned with a surface normal of the workpiece surface, for which the second image stack comprises a plurality of images of the workpiece surface and each image of the second image stack corresponds to a different focus position of the optical assembly portion along the direction of the optical axis.

25. The system of claim 24, wherein the operation that is executed on the workpiece surface includes utilizing a variable focal length (VFL) lens to capture the second image stack, wherein the VFL lens is part of the optical assembly portion and is included in the imaging optical path, and the objective lens transmits the image light along the imaging optical path through the VFL lens and the camera receives the imaging light transmitted by the VFL lens along the imaging optical path.

26. A method for operating a system including an optical assembly portion, wherein the optical assembly portion comprises:

a light source;

an objective lens that inputs image light arising from a surface of a workpiece which is illuminated by the light source, and transmits the image light along an imaging optical path, wherein the objective lens defines an optical axis of the optical assembly portion which extends at least between the objective lens and the workpiece surface; and a camera that receives imaging light transmitted along the imaging optical path and provides images of the workpiece surface;

the method comprising:

moving the optical assembly portion to position a workpiece surface within a focal Z autofocus range of the optical assembly portion;

capturing a first image stack of the workpiece surface within the focal Z autofocus range using the optical assembly portion, wherein the first image stack comprises a plurality of images of the workpiece surface and each image of the first image stack corresponds to a different autofocus height;

determining an autofocus height for at least three locations of the workpiece surface based on at least three corresponding regions of interest of the first image stack;

based at least in part on the autofocus heights at the at least three locations, determining adjustment information for rotating the optical assembly portion relative to the workpiece surface to nominally align the optical axis of the optical assembly portion with a surface normal of the workpiece surface and for adjusting a distance between the optical assembly portion and the workpiece surface;

utilizing the adjustment information for rotating the optical assembly portion to nominally align the optical axis of the optical assembly portion with a surface normal of the workpiece surface and for adjusting a distance between the optical assembly portion and the workpiece surface; and executing an operation on the workpiece surface, wherein the operation comprises capturing a second image stack while the optical axis of the optical assembly portion is nominally aligned with a surface normal of the workpiece surface, for which the second image stack comprises a plurality of images of the workpiece surface and each image of the second image stack corresponds to a different focus position of the optical assembly portion along the direction of the optical axis.

27. The method of claim 26, wherein the operation that is executed on the workpiece surface includes utilizing a variable focal length (VFL) lens to capture the second image stack, wherein the VFL lens is part of the optical assembly portion and is included in the imaging optical path, and the objective lens transmits the image light along the imaging optical path through the VFL lens and the camera receives the imaging light transmitted by the VFL lens along the imaging optical path.

* * * * *